(12) United States Patent
Bessho et al.

(10) Patent No.: US 8,375,391 B2
(45) Date of Patent: Feb. 12, 2013

(54) IMAGE PROCESSING APPARATUS, METHOD OF CONTROLLING IMAGE PROCESSING APPARATUS WITH EMULATION FUNCTION WHEN EXTERNAL STORAGE DEVICE IS ATTACHED, MANAGES PROCESSING OF JOBS AND SUB JOBS, AND RECORDING MEDIUM

(75) Inventors: Ichiro Bessho, Okazaki (JP); Harumitsu Fujimori, Machida (JP); Hiroyasu Ito, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 689 days.

(21) Appl. No.: 12/560,500

(22) Filed: Sep. 16, 2009

(65) Prior Publication Data

US 2010/0070976 A1    Mar. 18, 2010

(30) Foreign Application Priority Data

Sep. 16, 2008   (JP) ................................ 2008-236467

(51) Int. Cl.
*G06F 9/46*     (2006.01)
*G06F 15/16*    (2006.01)
*G06F 3/12*     (2006.01)

(52) U.S. Cl. ....... 718/102; 718/100; 709/203; 358/1.13; 358/1.15

(58) Field of Classification Search .......................... None
See application file for complete search history.

(56) References Cited

U.S. PATENT DOCUMENTS

| 7,052,190 B2 * | 5/2006 | Ishii ................................ 400/62 |
| 2005/0015540 A1 * | 1/2005 | Tsai et al. ...................... 711/103 |
| 2006/0161617 A1 * | 7/2006 | Zhong et al. .................. 709/203 |
| 2008/0137129 A1 * | 6/2008 | Ferlitsch ...................... 358/1.15 |
| 2008/0144105 A1 | 6/2008 | Yagi |

FOREIGN PATENT DOCUMENTS

| JP | 2003-131834 A | 5/2003 |
| JP | 2004-288052 A | 10/2004 |
| JP | 2006-339705 A | 12/2006 |
| JP | 2008-140006 A | 6/2008 |
| JP | 2008-153790 A | 7/2008 |

OTHER PUBLICATIONS

Office Action from Japanese Patent Office issued in Applicant's corresponding Japanese Patent Application No. 2008-236467 dated Aug. 3, 2010, and English translation thereof.

* cited by examiner

*Primary Examiner* — Meng An
*Assistant Examiner* — Bing Zhao
(74) *Attorney, Agent, or Firm* — Buchanan Ingersoll & Rooney PC

(57) ABSTRACT

Whether a job execution instruction has been issued or not is determined. When it is determined that the job execution instruction has been issued, a job ID is issued. Contents of the job in accordance with the job execution instruction are checked. Then, whether the job is a Scan to USB memory job in an emulation mode or not is determined. When it is determined that the job is the Scan to USB memory job in the emulation mode, a sub job ID brought in correspondence with the issued job ID is issued.

13 Claims, 16 Drawing Sheets

| JOB ID | SUB JOB ID | JOB | START TIME | COMPLETION TIME | STATUS |
|---|---|---|---|---|---|
| 000011 | | SCAN to USB MEMORY | 12:35 | 12:42 | NORMALLY ENDED |
| | S0 | Scan→MFP | 12:35 | 12:35 | NORMALLY ENDED |
| | S1 | MFP → EXTERNAL DEVICE | 12:35 | 12:36 | NORMALLY ENDED |
| | S2 | PROCESSING WITHIN EXTERNAL DEVICE | 12:36 | 12:40 | NORMALLY ENDED |
| | S3 | EXTERNAL DEVICE → MFP | 12:40 | 12:41 | NORMALLY ENDED |
| | S4 | MFP→USB(U3) MEMORY | 12:41 | 12:42 | NORMALLY ENDED |

FIG.19

JOB HISTORY CHECK SCREEN

| JOB ID | JOB | | DATA AMOUNT | DAY OF CREATION | START TIME | COMPLETION TIME | STATUS |
|---|---|---|---|---|---|---|---|
| 000011 | SCAN To USB (U3) MEMORY | | 56MB | 2007.03.13 | 12:35 | 12:42 | NORMALLY ENDED |
| | Scan→MFP | | | | 12:35 | 12:35 | NORMALLY ENDED |
| | MFP → EXTERNAL DEVICE | | | | 12:35 | 12:36 | NORMALLY ENDED |
| | PROCESSING WITHIN EXTERNAL DEVICE | | | | 12:36 | 12:40 | NORMALLY ENDED |
| | EXTERNAL DEVICE → MFP | | | | 12:40 | 12:41 | NORMALLY ENDED |
| | MFP → USB (U3) MEMORY | | | | 12:41 | 12:42 | NORMALLY ENDED |
| 000012 | COPY | 5 PAGES, 3 COPIES | 10MB | 2005.03.13 | 12:36 | 12:38 | NORMALLY ENDED |
| 000013 | COPY | 1 PAGE, 3 COPIES | 0.8MB | 2005.03.13 | 12:41 | 12:43 | NORMALLY ENDED |

FIG.20

JOB HISTORY CHECK SCREEN (REFERENCE EXAMPLE)

| JOB ID | JOB | | DATA AMOUNT | DAY OF CREATION | START TIME | COMPLETION TIME | STATUS |
|---|---|---|---|---|---|---|---|
| 000011 | Scan→MFP | | | | 12:35 | 12:35 | NORMALLY ENDED |
| 000012 | MFP → EXTERNAL DEVICE | | | | 12:35 | 12:36 | NORMALLY ENDED |
| 000013 | COPY | 5 PAGES, 3 COPIES | 10MB | 2005.03.13 | 12:36 | 12:38 | NORMALLY ENDED |
| 000014 | EXTERNAL DEVICE → MFP | | | | 12:40 | 12:41 | NORMALLY ENDED |
| 000015 | MFP → USB (U3) MEMORY | | | | 12:41 | 12:42 | NORMALLY ENDED |
| 000016 | COPY | 1 PAGE, 3 COPIES | 0.8MB | 2005.03.13 | 12:41 | 12:43 | NORMALLY ENDED |

# IMAGE PROCESSING APPARATUS, METHOD OF CONTROLLING IMAGE PROCESSING APPARATUS WITH EMULATION FUNCTION WHEN EXTERNAL STORAGE DEVICE IS ATTACHED, MANAGES PROCESSING OF JOBS AND SUB JOBS, AND RECORDING MEDIUM

This application is based on Japanese Patent Application No. 2008-236467 filed with the Japan Patent Office on Sep. 16, 2008, the entire content of which is hereby incorporated by reference.

BACKGROUND OF THE INVENTION

1. Field of the Invention

The present invention relates particularly to an image processing apparatus including a USB (Universal Serial Bus) connector to which a USB device is attachable.

2. Description of the Related Art

In recent years, a memory card or the like representing a removable external storage device for storing image data or the like has widely been used in a widely used portable information terminal (PDA) (Personal Data Assistance), a digital camera or the like.

In addition, an MFP (Multi Function Peripheral) representing one of image processing apparatuses capable, for example, of forming an image based on image data stored in the external storage device has widely been used.

Usually, a function to manage a job execution history is provided as a common function of the MFP, as described, for example, in Japanese Laid-Open Patent Publication No. 2006-339705.

Meanwhile, in recent years, a USB memory has widely been used as a removable external storage device, and data security measures have recently become important. Representing one exemplary measure, a USB memory including not only a data area but also an application area, capable of storing data in the data area using an encryption application or the like stored in the application area, has been introduced.

For example, a USB memory complying with U3 specifications set forth by SanDisk® Corporation (hereinafter also referred to as a U3 memory) is available.

As described above, in an example where a U3 memory is divided into a data area and an application area where an encryption application is stored, the application should be started up. In many cases, however, the application is adapted to a general-purpose OS (Operating System) generally used in a PC (Personal Computer) (such as Windows®) but not adapted to an embedded OS mounted on the MFP (such as VxWorks®).

Accordingly, the encryption application should be started up or the like in coordination with an external server or the like.

Specifically, in storing data of scanned image in a U3 memory attached to the MFP, that is, in executing a "Scan to USB memory job," the data of scanned image is once transferred to the external server, in which data processing such as encryption processing is performed. After the processing is performed, the external server transmits the encrypted data to the MFP and the data is stored in the U3 memory attached to the MFP.

In executing the Scan to USB memory job with the use of the external server as above, however, processing in coordination with the external server was not determined as the job of the MFP and hence detailed progress of a process could not be managed. In addition, even though a user intends execution of a single job as a command, the processing is performed as history of execution of a plurality of jobs. Namely, history of a series of executed jobs could not be grasped at a glance.

SUMMARY OF THE INVENTION

The present invention was made to solve the above-described problems. An object of the present invention is to provide an image processing apparatus allowing management of detailed progress of a process and facilitating checking of job execution history also when a job processed in coordination with an external server is executed.

An image processing apparatus according to the present invention is an image processing apparatus connected to an external terminal device through a network, including: a connector to which a removable external storage device is attachable; a scanner for obtaining image data by scanning a document image; an input device for accepting a user's operation input; a memory for storing a management table for managing history of job processing; and a controller configured to control the image processing apparatus. The controller determines whether data stored in the external storage device is accessible by the image processing apparatus or not, based on information output from the external storage device attached to the connector, causes the input device to emulate an operation function of the external terminal device for remotely operating the external storage device when the data stored in the external storage device is inaccessible by the image processing apparatus, determines whether the input device has accepted an instruction input indicating execution of job processing including at least one sub job or not, indicates execution of the sub job based on contents of the job processing when it is determined that the input device has accepted the instruction input indicating execution of the job processing, issues an identification number in accordance with an order of execution of the job processing and causes the management table to store the identification number, monitors a processing state of the processing corresponding to the issued identification number of the job processing and causes the management table to store the processing state. When the contents of the job processing include execution of a plurality of sub jobs, the controller issues a sub identification number associated with the identification number issued in correspondence with the accepted job, in accordance with the order of the processing and causes the management table to store the sub identification number, and monitors a processing state of the sub job corresponding to each sub identification number and causes the management table to store the processing state.

Preferably, the contents of the job processing include a sub job for obtaining the image data by scanning the document image with the scanner, a sub job for transmitting the obtained image data to the external terminal device, a sub job for subjecting the image data transmitted to the external terminal device to processing based on a prescribed application, a sub job for receiving the image data transmitted from the external terminal device, that has been subjected to the processing based on the prescribed application, and a sub job for writing received data into the external storage device inaccessible by the image processing apparatus.

Preferably, the image processing apparatus further includes a display, and the controller causes the display to display a group of the processing states corresponding to respective sub identification numbers associated with the issued identification numbers stored in the management table.

A method of controlling an image processing apparatus according to the present invention is a method of controlling an image processing apparatus connected to an external terminal device through a network. The image processing apparatus includes a connector to which a removable external storage device is attachable, a scanner for obtaining image data by scanning a document image, an input device for accepting a user's operation input, a memory for storing a management table for managing history of job processing, and a controller configured to control the image processing apparatus. The method includes the steps of: determining whether data stored in the external storage device is accessible by the image processing apparatus or not, based on information output from the external storage device attached to the connector; causing the input device to emulate an operation function of the external terminal device for remotely operating the external storage device when the data stored in the external storage device is inaccessible by the image processing apparatus; determining whether the input device has accepted an instruction input indicating execution of the job processing including at least one sub job or not; indicating execution of the sub job based on contents of the job processing when it is determined that the input device has accepted the instruction input indicating execution of the job processing; issuing an identification number in accordance with an order of execution of the job processing; causing the management table to store the issued identification number; monitoring a processing state of the processing corresponding to the issued identification number of the job processing; and causing the management table to store the monitored processing state. The step of issuing an identification number includes the step of issuing, when the contents of the job processing include execution of a plurality of sub jobs, a sub identification number associated with the identification number issued in correspondence with the accepted job, in accordance with the order of the processing. The step of causing the management table to store the issued identification number includes the step of causing the management table to store the issued sub identification number. The step of monitoring a processing state includes the step of monitoring the sub job corresponding to each sub identification number. The step of causing the management table to store the monitored processing state includes the step of causing the management table to store the processing state of the processing corresponding to each sub identification number.

Preferably, the contents of the job processing include a sub job for obtaining the image data by scanning the document image with the scanner, a sub job for transmitting the obtained image data to the external terminal device, a sub job for subjecting the image data transmitted to the external terminal device to processing based on a prescribed application, a sub job for receiving the image data transmitted from the external terminal device, that has been subjected to the processing based on the prescribed application, and a sub job for writing received data into the external storage device inaccessible by the image processing apparatus.

Preferably, the image processing apparatus further includes a display. The method further includes the step of displaying in a list, on the display, a processing state corresponding to each sub identification number associated with the issued identification number stored in the management table.

A recording medium according to the present invention is a recording medium for recording a control program to be executed by a computer included in an image processing apparatus connected to an external terminal device through a network. The image processing apparatus includes a connector to which a removable external storage device is attachable, a scanner for obtaining image data by scanning a document image, an input device for accepting a user's operation input, a memory for storing a management table for managing history of job processing, and a controller configured to control the image processing apparatus. The control program causes the computer to perform processing including the steps of: determining whether data stored in the external storage device is accessible by the image processing apparatus or not, based on information output from the external storage device attached to the connector; causing the input device to emulate an operation function of the external terminal device for remotely operating the external storage device when the data stored in the external storage device is inaccessible by the image processing apparatus; determining whether the input device has accepted an instruction input indicating execution of the job processing including at least one sub job or not; indicating execution of the sub job based on contents of the job processing when it is determined that the input device has accepted the instruction input indicating execution of the job processing; issuing an identification number in accordance with an order of execution of the job processing; causing the management table to store the issued identification number; monitoring a processing state of the processing corresponding to the issued identification number of the job processing; and causing the management table to store the monitored processing state. The step of issuing an identification number includes the step of issuing, when the contents of the job processing include execution of a plurality of sub jobs, a sub identification number associated with the identification number issued in correspondence with the accepted job, in accordance with the order of the processing. The step of causing the management table to store the issued identification number includes the step of causing the management table to store the issued sub identification number. The step of monitoring a processing state includes the step of monitoring the sub job corresponding to each sub identification number. The step of causing the management table to store the monitored processing state includes the step of causing the management table to store the processing state of the processing corresponding to each sub identification number.

Preferably, the contents of the job processing include a sub job for obtaining the image data by scanning the document image with the scanner, a sub job for transmitting the obtained image data to the external terminal device, a sub job for subjecting the image data transmitted to the external terminal device to processing based on a prescribed application, a sub job for receiving the image data transmitted from the external terminal device, that has been subjected to the processing based on the prescribed application, and a sub job for writing received data into the external storage device inaccessible by the image processing apparatus.

Preferably, the image processing apparatus further includes a display, and the control program causes the computer to perform processing further including the step of displaying in a list, on the display, a processing state corresponding to each sub identification number associated with the issued identification number stored in the management table.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a diagram illustrating a job history check screen according to the embodiment of the present invention.

FIG. 20 is a diagram illustrating a job history check screen according to a comparative example.

DESCRIPTION OF THE PREFERRED EMBODIMENTS

Figure 1:
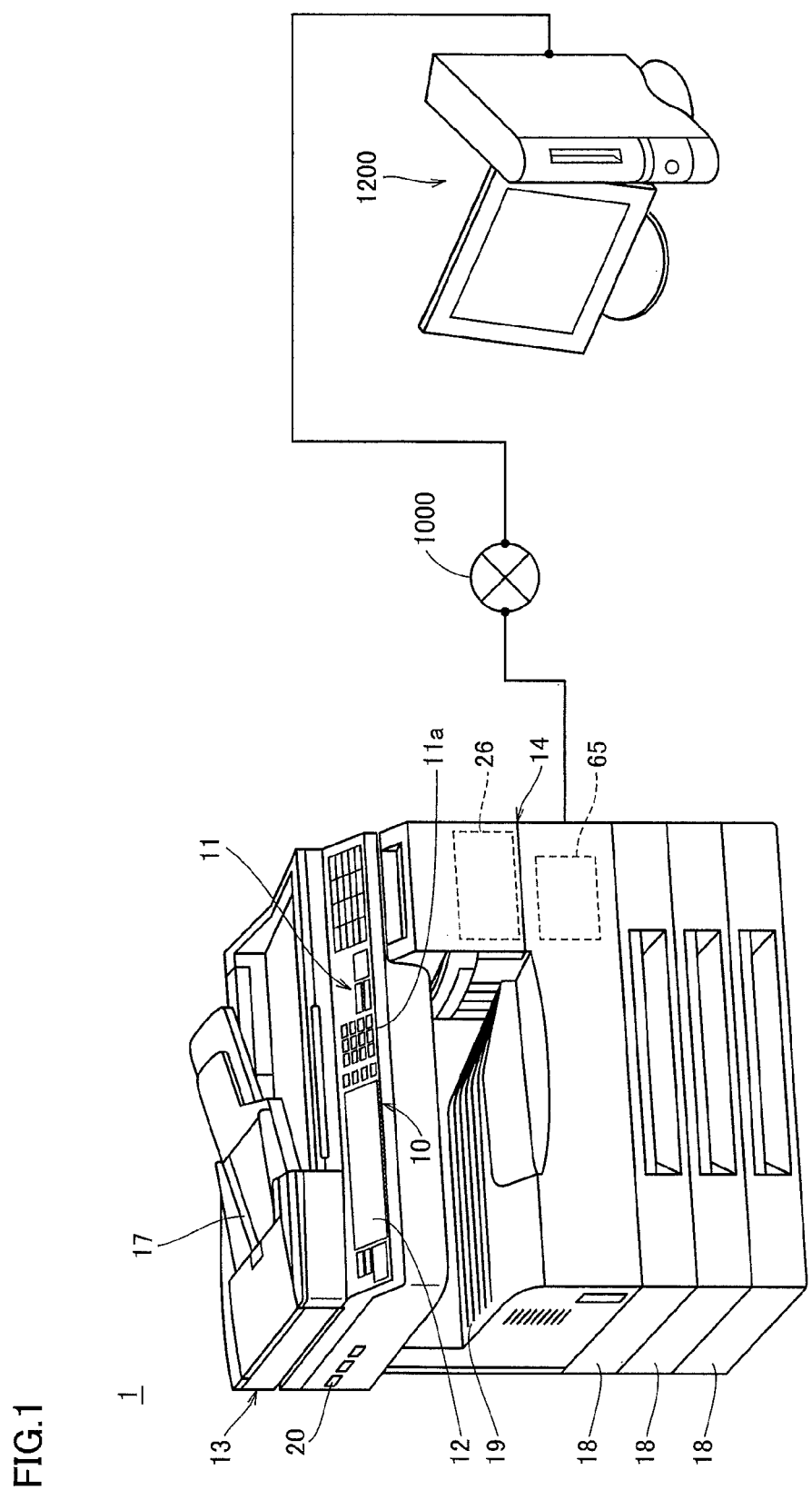
FIG. 1 is a schematic diagram illustrating an image processing system according to an embodiment of the present invention.

An embodiment of the present invention will be described hereinafter with reference to the drawings. In the description below, the same part and component have the same reference characters allotted. Their label and function are also assumed as identical.

An image processing system according to an embodiment of the present invention will be described with reference to FIG. 1.

Referring to FIG. 1, the image processing system according to the embodiment of the present invention includes an MFP 1 and a server 1200 connected to MFP 1 through a network 1000.

MFP 1 is a digital multifunctional machine having a copy function, a scanner function, and a printer function, and various functions are implemented by an embedded OS. On the other hand, in server 1200, various functions are implemented by a general-purpose OS, unlike the embedded OS in MFP 1.

MFP 1 has ports 20 serving as connection means, to which a plurality of (in the present embodiment, three) external storage devices complying with the USB specifications are removably attached, and a USB device including a USB memory, which is a removable external storage device having a USB interface, is connected to this port 20 so that bidirectional data transmission and reception between the external storage device and MFP 1 can be carried out. Port 20 is also hereinafter referred to as a USB port or a USB connector.

In the present embodiment, for example, a case where a USB interface is adopted and a USB memory is connected to the port will be described, however, the interface is not limited to the USB. Connection of other removable external storage devices such as a CF (Compact Flash) card is also similarly applicable. In addition, in the present embodiment, a case where a U3 memory representing a USB memory complying with the USB specifications is attached to port 20 as the USB memory will be described.

MFP 1 includes an operation panel portion 10. Operation panel portion 10 has a plurality of keys 11a, an operation portion 11 for accepting input of data such as various instructions, characters, numerics, and the like provided by user's operation of key 11a, and an operation display 12 implemented by liquid crystals or the like, for display of an instruction menu for the user or information on an obtained image.

MFP 1 includes a scanner 13 for obtaining image data by optically reading a document and a printer 14 for printing an image on a recording sheet based on the image data. In addition, a feeder portion 17 for feeding a document to scanner 13 is provided on an upper surface of a main body of MFP 1, a paper feed portion 18 for supplying a recording sheet to printer 14 is provided in a lower portion thereof, and a tray 19 where a recording sheet having an image printed by printer 14 is provided in a central portion thereof.

In addition, a communication portion 65 for transmitting and receiving image data to and from external equipment, a memory 26 for storing a control program used in each unit for controlling the main body and necessary data such as image data, and the like are provided in the main body of MFP 1.

Moreover, communication portion 65 is connected to server 1200 representing the external equipment connected to network 1000.

A configuration of server 1200 will be described later.

Operation display 12 provides display of various modes and others, and various settings and the like can be made in accordance with display contents and the like. In addition, operation portion 11 is used for user's various inputs. These components function as a main part of the user interface.

Scanner 13 obtains image data by photoelectrically reading image information such as a photograph, a character, graphics, and the like from a document. The obtained image data (density data) is converted to digital data, subjected to well-known various types of image processing, and sent to printer 14 if an image is to be printed, or transmitted to other external equipment connected to the network through communication portion 65 if image transmission processing is to be performed. Alternatively, the obtained image data is stored in the USB memory in accordance with a prescribed format as will be described later.

Printer 14 serves to print an image on a recording sheet, based on image data obtained by scanner 13, image data stored in a USB memory or the like representing a removable external storage device, or image data transmitted from external equipment.

Communication portion 65 transmits and receives data to and from server 1200 representing external equipment connected to network 1000 such as LAN (Local Area Network) or the Internet through the public switched telephone network. It is noted that communication established by MFP 1 through a network may be any of wire communication and wireless communication.

A functional block diagram of MFP 1 representing the image processing apparatus according to the embodiment of the present invention will be described with reference to FIG. 2.

Figure 2:
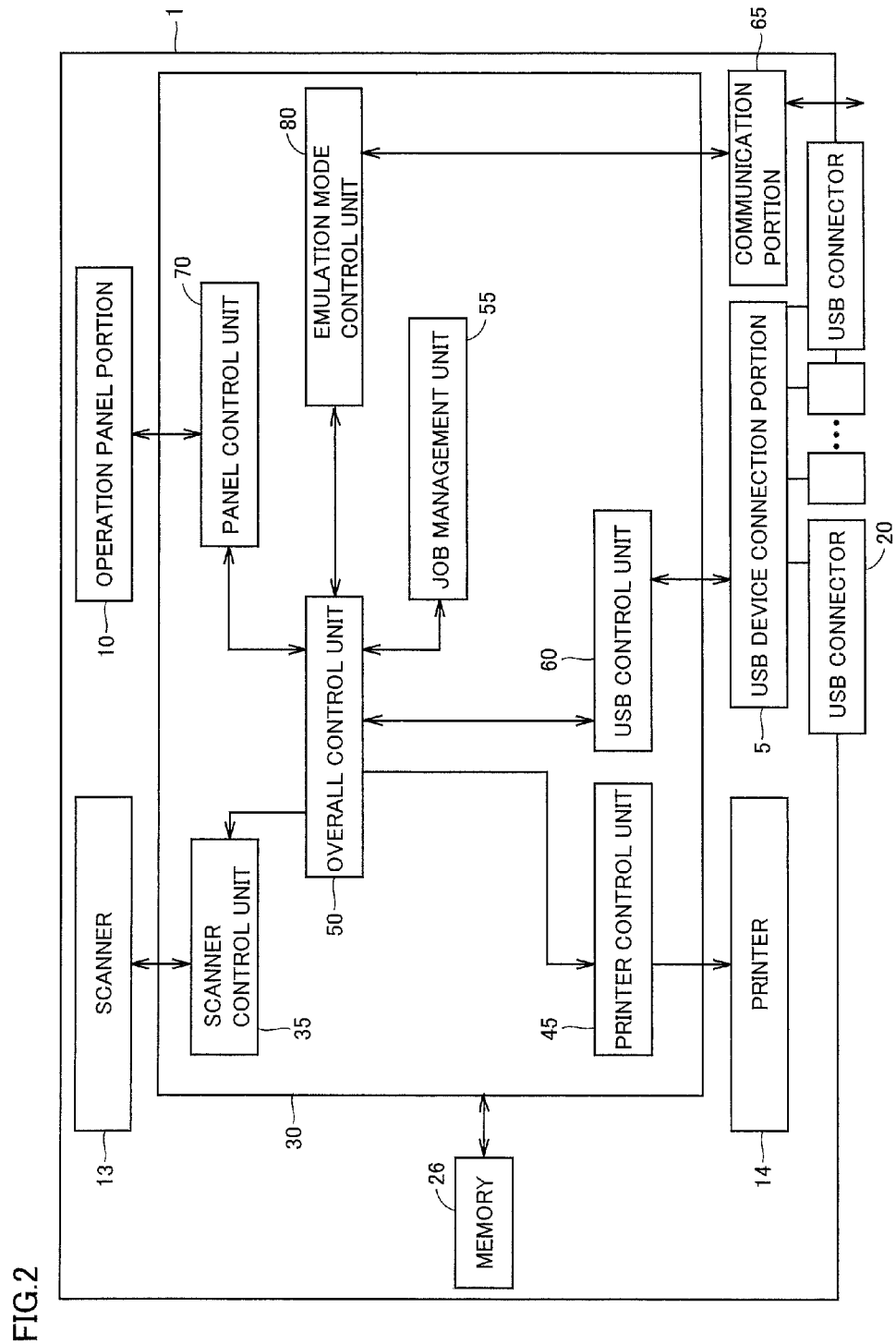
FIG. 2 is a functional block diagram of an MFP representing an image processing apparatus according to the embodiment of the present invention.

Referring to FIG. 2, MFP 1 according to the embodiment of the present invention includes scanner 13 for converting a material such as a paper medium or the like into electronic data, memory 26 implemented, for example, by a hard disk drive (HDD), printer 14 for performing print processing, a USB connector 20 for attaching each USB device, a USB device connection portion 5 for controlling connection between USB connector 20 and a USB device, operation panel portion 10 including the operation display, a controller 30 for overall control of the MFP, and communication portion 65 for transmitting and receiving data to and from server 1200 representing external equipment through network 1000.

When the USB device is attached to USB connector 20, USB device connection portion 5 senses attachment and outputs attachment information on the attached device to controller 30.

Each functional block of controller 30 is implemented by reading an embedded OS and various software programs adapted to the embedded OS stored in memory 26.

Specifically, controller 30 includes a scanner control unit 35 for controlling scanner 13, a printer control unit 45 for controlling printer 14, a USB control unit 60 for accessing the USB device attached to USB connector 20 through USB device connection portion 5, a panel control unit 70 for accepting display contents to be displayed on operation panel portion 10 and an operation input through operation panel portion 10, an emulation mode control unit 80 for performing processing for controlling an emulation mode which will be described later, and an overall control unit 50 for controlling these units above as a whole and instructing each unit to carry out a prescribed job in response to an operation instruction input from operation panel portion 10. It is noted that overall control unit 50 functions as the embedded OS.

Emulation mode control unit 80 receives input data from external equipment through communication portion 65 and outputs the input data to overall control unit 50 when transition to the emulation mode is made, and transmits the data input from overall control unit 50 to server 1200 representing the external equipment through communication portion 65 so as to emulate a function of server 1200, so that server 1200 can remotely be operated.

USB control unit 60 senses a device attached to USB connector 20 through USB device connection portion 5 and outputs information on the device to overall control unit 50.

Overall control unit 50 determines whether the device attached to USB connector 20 is recognizable or not, based on the information on that device output from USB control unit 60. When the device is recognized, access to the device is permitted. Specifically, for example, when a common USB memory is recognized, processing or the like for writing data such as image data obtained by scanning processing by scanner 13 can be performed by providing an instruction to access the USB memory through operation panel portion 10.

A configuration of operation panel portion 10 in MFP 1 according to the embodiment of the present invention will be described with reference to FIG. 3.

Figure 3:
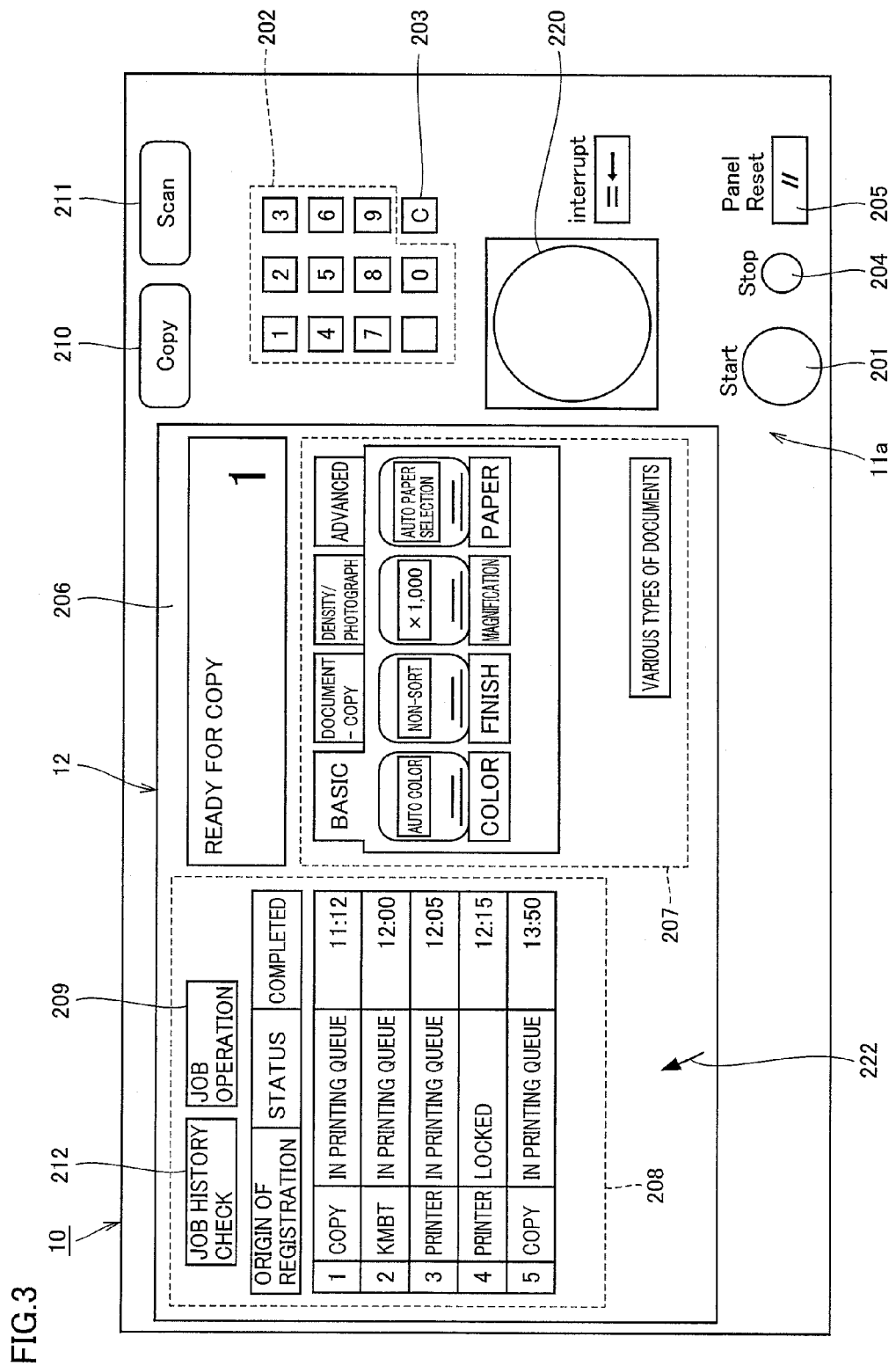
FIG. 3 is a diagram illustrating a configuration of an operation panel portion in the MFP according to the embodiment of the present invention.

Referring to FIG. 3, a start key 201 is used for starting an operation such as copy/scan or the like. A numeric key 202 is used for entering a numeric value or the like such as the number of copies or a password which will be described later. A clear key 203 is used for clearing an entered numeric value and erasing stored image data.

A stop key 204 is used for indicating stop of a copy/scanning operation. A panel reset key 205 is used for canceling a set mode and a job. In addition, when stop key 204 is pressed during processing for writing data into the USB device or during data printing, an operation to write data into the USB device or a data printing operation is stopped.

In addition, a trackball 220 is a pointing device for moving a pointer 222 when pointer 222 is displayed on operation display 12.

Operation display 12 is provided with a touch panel 206 for display of various modes or for making setting or the like.

Through this touch panel 206, the user can make various settings in accordance with display contents on operation display 12. In addition, in a setting screen area 207 of touch panel 206, normally, buttons for basic/advanced setting that is made in a copy operation or a scanning operation are arranged. When each button is pressed, a screen layer for making detailed setting is displayed. It is noted that an operation as performed with touch panel 206 can be performed by moving pointer 222 with trackball 220 and then pressing, for example, start key 201.

In a job information screen area 208 of touch panel 206, job information provided to MFP 1 by that time point is displayed. Jobs are displayed in the order of execution. When an operation for canceling or modifying a specific job is to be performed, a job operation button 209 is selected and thereafter a job number button of interest is pressed. Through these operations, a job operation screen is displayed and an operation on a specific job can be permitted. In addition, by pressing a job history check button 212, history of executed jobs can be checked.

A copy key 210 and a scan key 211 are selection keys for setting whether MFP 1 should operate in any mode of a copier and a scanner.

When copy key 210 is pressed, MFP 1 can be used as a copier. A scanner operation cannot be performed in this state.

Alternatively, when scan key 211 is pressed, MFP 1 serves as a scanner. A copy operation cannot be performed in this state.

Copy key 210 and scan key 211 are mutually exclusive. Therefore, if one is selected, the other is automatically in a non-selected state.

Though the description will be provided later, in the emulation mode, an operation display screen of server 1200 is displayed on display 12.

A functional block diagram of server 1200 according to the embodiment of the present invention will be described with reference to FIG. 4.

Figure 4:
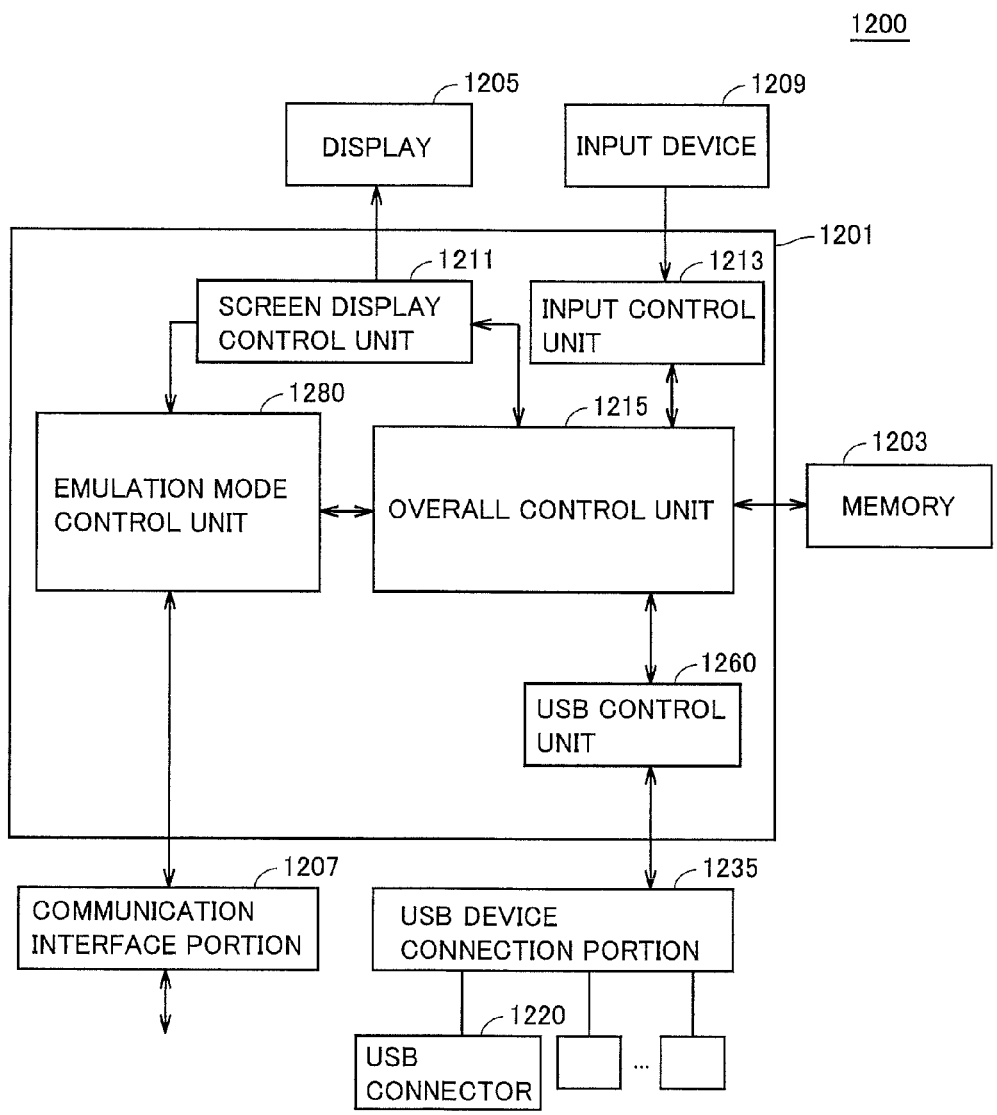
FIG. 4 is a functional block diagram of a server according to the embodiment of the present invention.

Referring to FIG. 4, server 1200 according to the embodiment of the present invention includes an input device 1209 such as a mouse or a keyboard, a display 1205 for displaying an operation display screen, a communication interface portion 1207 for transmitting and receiving data to and from outside through network 1000, a memory 1203 implemented, for example, by a hard disk drive (HDD), a USB connector 1220 which is a port for connecting, for example, a USB memory representing a removable external storage device, a USB device connection portion 1235 for controlling connection between USB connector 1220 and a USB device, and a controller 1201 for overall control of server 1200.

When the USB device is attached to USB connector 1220, USB device connection portion 1235 senses attachment and outputs attachment information on the attached device to controller 1201.

Each functional block of controller 1201 is implemented by reading a general-purpose OS and various software programs adapted to the general-purpose OS stored in memory 1203.

Specifically, controller 1201 includes a USB control unit 1260 for accessing the USB device attached to USB connector 1220 through USB device connection portion 1235, an input control unit 1213 for accepting an operation input through input device 1209, a screen display control unit 1211 for controlling display processing or the like of display 1205, and an emulation mode control unit 1280 for performing processing for controlling an emulation mode which will be described later. It is noted that an overall control unit 1215 functions as the general-purpose OS.

In addition, emulation mode control unit 1280 performs processing for data transfer to/from emulation mode control unit 80 in MFP 1.

USB control unit 1260 senses a device attached to USB connector 1220 through USB device connection portion 1235 and outputs information on the device to overall control unit 1215.

Overall control unit 1215 determines whether the device attached to USB connector 1220 is recognizable or not, based on the information on that device output from USB control unit 1260. When the device is recognized, access to the device is permitted. Specifically, for example, when a common USB memory is recognized, an instruction or the like to access the USB memory can be provided through input device 1209 while viewing the operation display screen displayed on display 1205.

A configuration of a U3 memory according to the embodiment of the present invention will be described with reference to FIG. 5.

Figure 5:
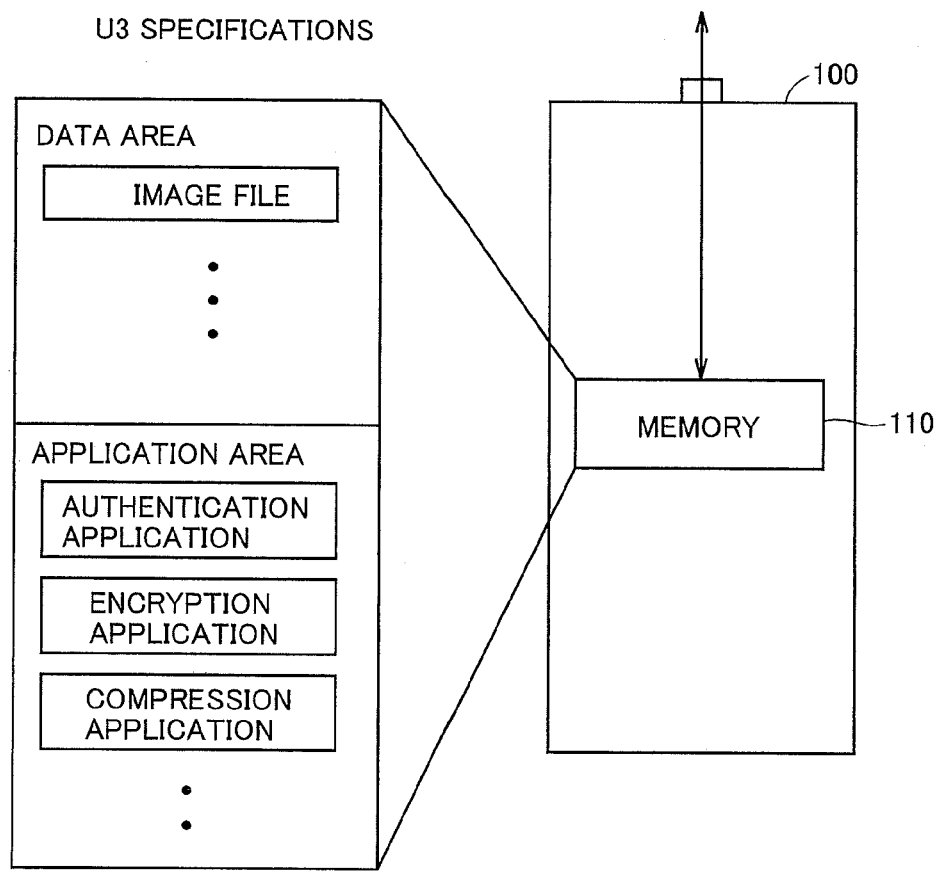
FIG. 5 is a schematic diagram illustrating a configuration of a U3 memory according to the embodiment of the present invention.

Referring to FIG. 5, in the present embodiment, a USB memory complying with the U3 specifications will be described by way of example. A USB memory 100 complying with the U3 specifications includes a memory portion 110 where data is stored, and memory portion 110 is divided into a data area and an application area. As described above, the application area can store an application complying with the U3 specifications, and an example where an authentication application is stored is shown here. In addition, other applications such as an encryption application for storing image data in the data area in an encrypted state and a compression application for storing image data in the data area in a compressed state are shown by way of example.

In the present embodiment, when the U3 memory is attached to USB connector 20, start-up data information of the authentication application which is an application complying with the U3 specifications is output.

In addition, the application in the USB memory complying with the U3 specifications is not adapted to the embedded OS but adapted to the general-purpose OS.

Namely, the application shown here is an application executed by server 1200, and in the present embodiment, the application stored in USB memory 100 complying with the U3 specifications is automatically read into server 1200.

When data is written in the USB memory complying with the U3 specifications, for example, when a Scan to USB memory job is executed, overall control unit 1215 of server 1200 automatically executes the encryption application so that scan data is subjected to encryption processing. Alternatively, compression processing may be performed by using a compression application. Alternatively, combination of the above may be applicable. In addition, an application is not limited as such and other applications may also be employed.

In the present embodiment, description will be given assuming that an application is automatically executed by server 1200, however, setting for execution of the application may also be made in the operation screen in FIG. 8 that is displayed while server 1200 is remotely operated, as will be described later.

Processing for executing the emulation mode when the USB memory complying with the U3 specifications according to the embodiment of the present invention is attached to MFP 1 will be described with reference to FIG. 6.

Figure 6:
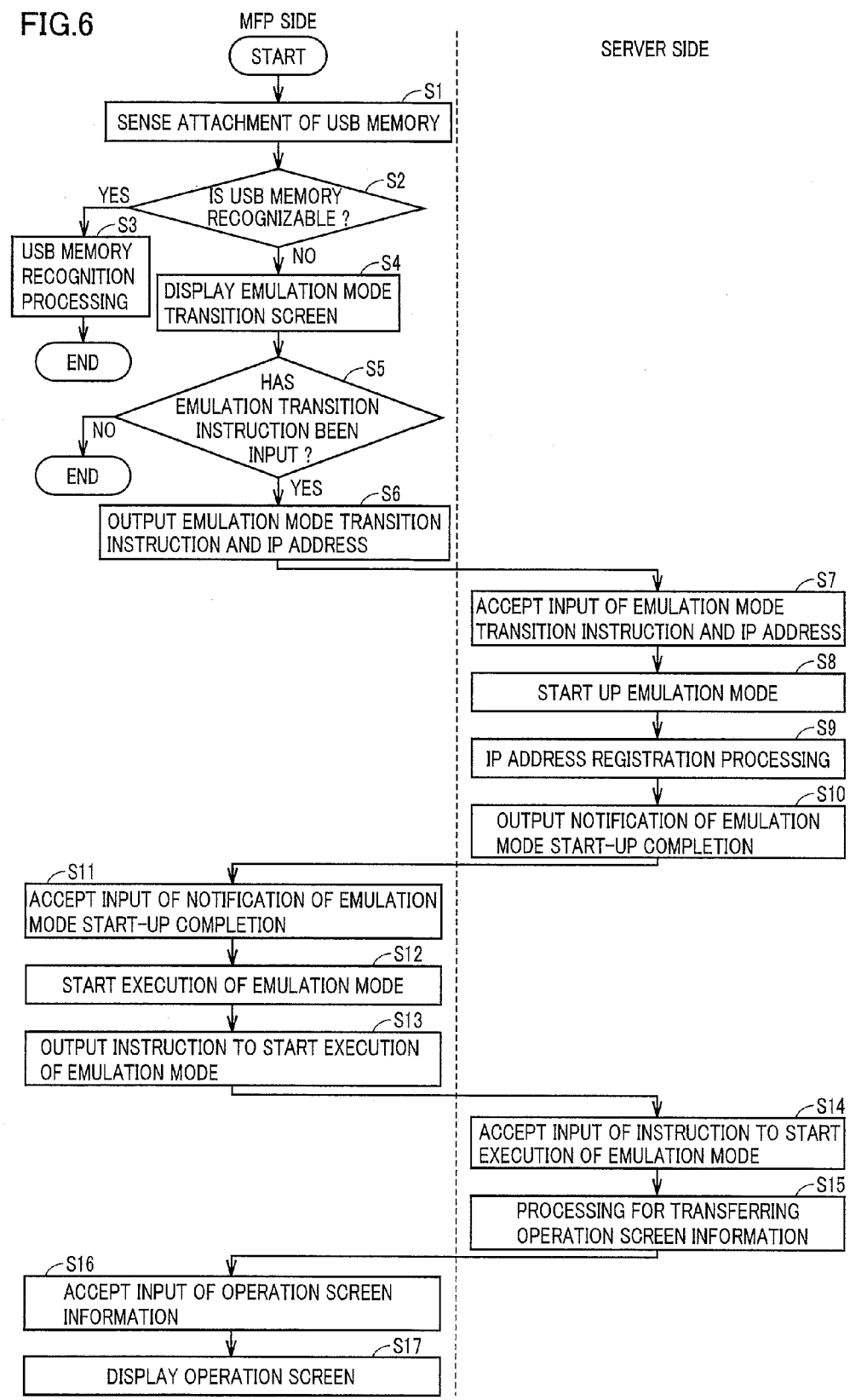
FIG. 6 is a flowchart illustrating processing for executing an emulation mode when a USB memory complying with the U3 specifications according to the embodiment of the present invention is attached to the MFP.

Referring to FIG. 6, initially on MFP 1 side, attachment of the USB memory is sensed (step S1). Specifically, USB device connection portion 5 senses attachment of the U3 memory attached to USB connector 20. Then, receiving input of sensing information from USB device connection portion 5, USB control unit 60 outputs data information output from the U3 memory to overall control unit 50 through USB device connection portion 5. It is noted that the data information output from the U3 memory is stored in a not-shown memory.

Then, overall control unit 50 determines whether the USB memory is recognizable or not, based on the data information output from the USB memory (step S2). In step S2, when the USB memory is recognizable based on the data information output from the USB memory, overall control unit 50 performs processing for recognizing the USB memory (step S3). Specifically, when the attached USB memory was successfully recognized, overall control unit 50 performs prescribed registration processing or the like so that a job involved with the USB memory can be executed through operation panel portion 10.

On the other hand, when the USB memory was unrecognizable in step S2, overall control unit 50 gives an instruction to panel control unit 70 so that an emulation mode transition screen is displayed on operation display 12 of operation panel portion 10. Thus, panel control unit 70 causes operation display 12 to display the emulation mode transition screen (step S4).

An example where the emulation mode transition screen according to the embodiment of the present invention is displayed on operation display 12 will be described with reference to FIG. 7.

Figure 7:
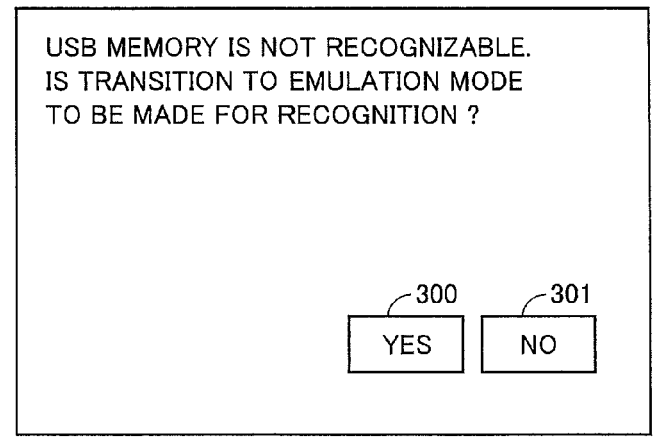
FIG. 7 is a diagram illustrating an example where an emulation mode transition screen according to the embodiment of the present invention is displayed on an operation display.

Referring to FIG. 7, buttons 300 and 301 urging the user to perform a selection operation as to whether to make transition to the emulation mode or not are displayed, together with an indication that "USB memory is not recognizable. Is transition to emulation mode to be made for recognition?" For example, when the user presses button 300, transition to the emulation mode is started. On the other hand, when button 301 is pressed, transition to the emulation mode is canceled. Specifically, when pressing of button 300 is sensed through panel control unit 70, overall control unit 50 instructs emulation mode control unit 80 to start transition to the emulation mode.

On the other hand, when pressing of button 301 is sensed through panel control unit 70, overall control unit 50 ends recognition processing regarding the attached USB memory. Namely, the device attached to the USB connector is processed as an unrecognizable device and access or the like is prohibited.

Referring again to FIG. 6, subsequent to step S4, whether an instruction for transition to the emulation mode has been input or not is then determined (step S5). Specifically, as described above, when button 300 for starting transition to the emulation mode in FIG. 7 is sensed and an instruction to start transition to the emulation mode is given from overall control unit 50 to emulation mode control unit 80, an instruction signal for transition to the emulation mode and an IP (Internet Protocol) address of MFP 1 on the network are output (step S6).

Specifically, as the instruction to start transition to the emulation mode is received from panel control unit 70, the instruction signal for transition to the emulation mode and the IP address are output to server 1200 connected to the network through communication portion 65. It is noted that an IP address of server 1200 connected to the network, which is a destination from communication portion 65, is registered in advance.

Then, on server 1200 side, input of the instruction signal for transition to the emulation mode and the IP address is accepted (step S7). Specifically, emulation mode control unit 1280 provided on server 1200 side accepts input of the instruction signal for transition to the emulation mode and the IP address.

Then, as the input of the instruction signal for transition to the emulation mode is received, the emulation mode is started up (step S8). Specifically, an indication that the emulation mode is set is output to overall control unit 1215. As a result of this processing, overall control unit 1215 of server 1200 performs processing in the emulation mode.

Thereafter, processing for registering the input IP address of MFP 1 is performed (step S9). Specifically, the IP address of MFP 1 is registered as a data destination address in server 1200.

Then, a notification signal of emulation mode start-up completion is output (step S10).

Specifically, the notification signal of emulation mode start-up completion is output to MFP 1 through communication interface portion 1207 after the emulation mode is started up.

Thereafter, on MFP 1 side, input of the notification signal of emulation mode start-up completion is accepted (step S11). Specifically, emulation mode control unit 80 provided on MFP 1 side accepts the input of the notification signal of emulation mode start-up completion.

Then, as the input of the notification signal of emulation mode start-up completion is received, execution of the emulation mode is started (step S12). Specifically, an indication that the emulation mode is set is output to overall control unit 50. As a result of this processing, overall control unit 50 of MFP 1 performs processing in the emulation mode.

Then, an instruction signal to start execution of the emulation mode is output to server 1200 through communication portion 65 (step S13).

Thereafter, emulation mode control unit 1280 of server 1200 accepts input of the instruction signal to start execution of emulation (step S14).

Thereafter, processing for transferring operation screen information is performed (step S15).

Specifically, receiving the input of the instruction signal to start execution of emulation, overall control unit 1215 instructs screen display control unit 1211 to output screen information on display contents similar to contents displayed on the operation screen of display 1205 (also referred to as operation screen information) to emulation mode control unit 1280. Then, emulation mode control unit 1280 transfers the operation screen information to MFP 1 through communication interface portion 1207.

Here, if the OS of server 1200 is a general-purpose OS and the OS of MFP 1 is an embedded OS, the type of OS is different. Therefore, overall control unit 50 of MFP 1 adapted to the embedded OS cannot perform the same processing using data the same as data on server 1200 side.

Therefore, the server side performs emulation processing so that the same processing as with the general-purpose OS can be performed with the embedded OS and transfers data to MFP 1.

Then, on MFP 1 side, input of the operation screen information is accepted (step S16).

Specifically, emulation mode control unit 80 provided on MFP 1 side accepts input of the operation screen information.

Thereafter, operation display 12 of operation panel portion 10 displays the operation screen based on the operation screen information (step S17).

Specifically, receiving the operation screen information that has been subjected to emulation processing, overall control unit 50 outputs the operation screen information to panel control unit 70. Then, panel control unit 70 causes operation display 12 to display the operation screen based on the operation screen information.

The operation screen displayed on operation display 12 based on the operation screen information according to the embodiment of the present invention will be described with reference to FIG. 8.

Figure 8:
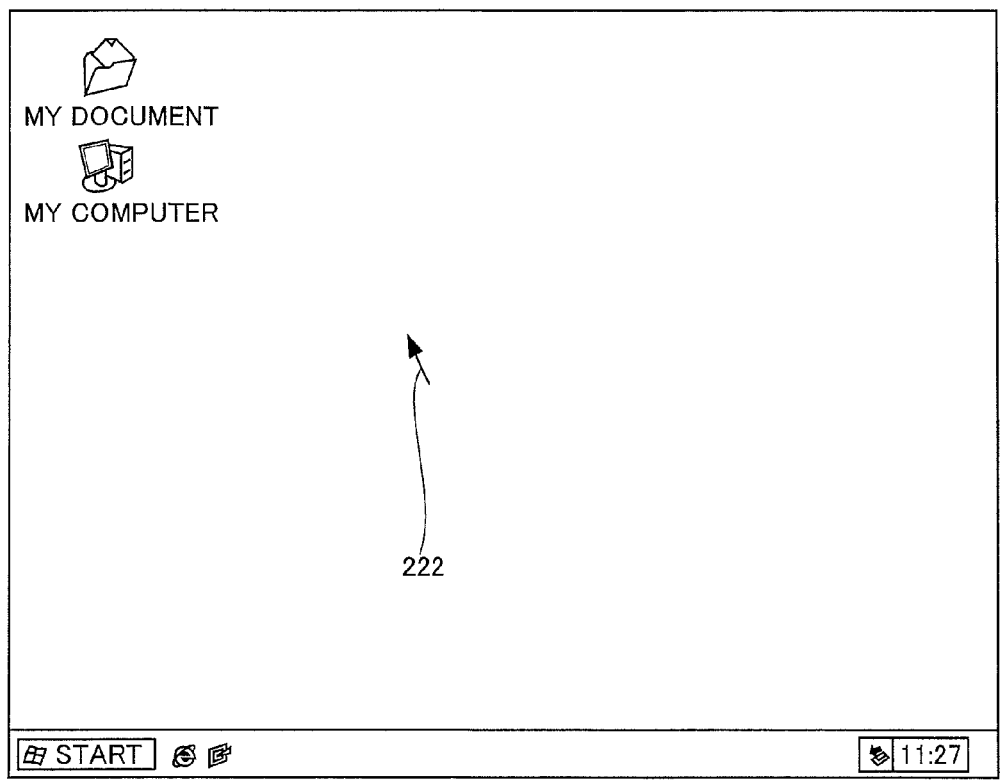
FIG. 8 is a diagram illustrating an operation screen displayed on the operation display based on operation screen information according to the embodiment of the present invention.

Referring to FIG. 8, an example where the operation screen identical in contents to the operation screen displayed on display 1205 of server 1200 is displayed as display contents on operation display 12 is shown here. The user can freely operate pointer 222 on the operation screen by operating trackball 220 described above. The selection operation can be performed by using start key 201 in operation panel portion 10.

Namely, the operation screen the same as the operation screen displayed on display 1205 of server 1200 is shown on operation display 12 of MFP 1, and the user can operate pointer 222 with trackball 220 and perform the selection operation by using start key 201. According to the configuration of the present embodiment, as a result of emulation processing by emulation mode control units 80 and 1280, the functions of input device 1209 and display 1205 of server 1200 can be emulated on operation panel portion 10 of MFP 1, so that server 1200 is remotely operated.

Specifically, emulation mode control units 80 and 1280 are used to emulate display 1205 so that the operation screen of server 1200 input through communication portion 65, that is, the operation screen displayed on display 1205 of server 1200, is displayed on operation display 12 of operation panel portion 10.

In addition, input device 1209 may be emulated so that the operation instruction input the same as the operation instruction input provided through input device 1209 of server 1200 can be provided by operating operation panel portion 10.

As described above, if the OS of server 1200 is a general-purpose OS and the OS of MFP 1 is an embedded OS, the type of OS is different. Therefore, the operation instruction input through operation panel portion 10 on MFP 1 side cannot be processed as it is with the use of the general-purpose OS on server 1200 side.

Therefore, an operation instruction input signal output from emulation mode control unit 80 on MFP 1 side is subjected to emulation processing so that the operation instruction input adapted to the embedded OS can be processed with the general-purpose OS in emulation mode control unit 1280 of server 1200 and then output to overall control unit 1215.

In the present embodiment, an example where emulation control unit 1280 on server 1200 side performs emulation processing in transmission so that processing by the embedded OS on MFP 1 side can be performed and performs emulation processing in reception so that the instruction signal from the embedded OS can be processed by the general-purpose OS is described. In contrast, however, emulation control unit 80 on MFP 1 side may perform emulation processing in transmission so that processing by the general-purpose OS on server 1200 side can be performed and perform emulation processing in reception so that the instruction signal from the general-purpose OS can be processed by the embedded OS.

Processing for starting up an application stored in the U3 memory described in connection with FIG. 5 in the emulation mode according to the embodiment of the present invention will now be described.

Processing for starting up an application stored in the U3 memory according to the embodiment of the present invention will be described with reference to FIG. 9.

Figure 9:
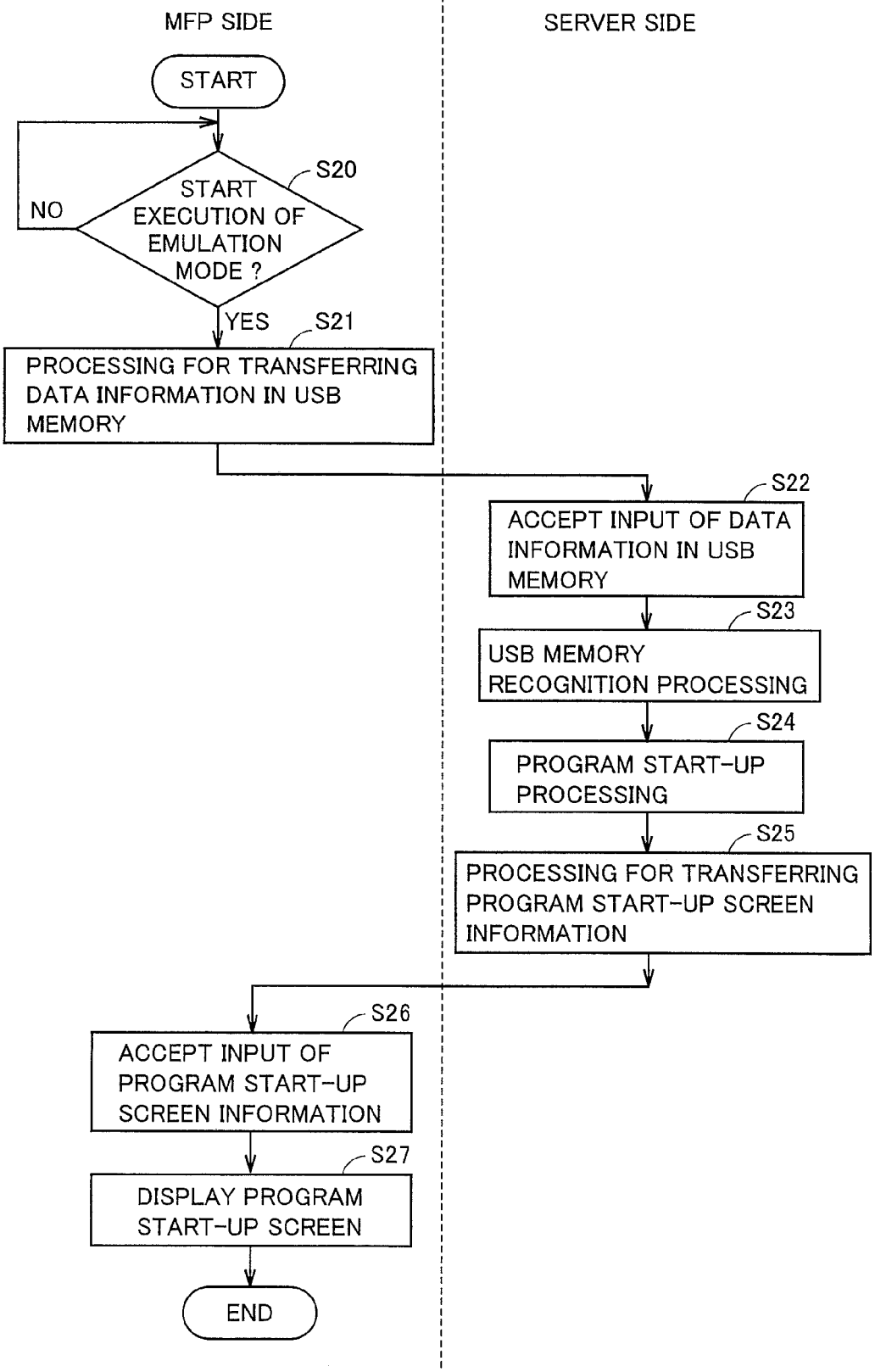
FIG. 9 is a flowchart illustrating processing for starting up an application stored in the U3 memory according to the embodiment of the present invention.

Referring to FIG. 9, overall control unit 50 determines whether execution of the emulation mode has been started or not (step S20). Specifically, in the flow in FIG. 6 as described above, the input of the notification signal of emulation mode start-up completion is accepted (step S11) and thereafter execution of the emulation mode is started (step S12). Emulation mode control unit 80 performs processing in the emulation mode in accordance with an instruction from overall control unit 50.

Thereafter, when execution of the emulation mode is started, overall control unit 50 performs processing for transferring the data information output from the U3 memory (step S21). In the flowchart in FIG. 6 above, an example where after execution of the emulation mode is started, the instruction signal to start execution of emulation is output, input of the operation screen information is accepted, and the operation screen is displayed on operation display 12 has been described. Meanwhile, in parallel to this processing, the processing in step S21 above is performed. It is noted that the processing in step S21 above may also be performed after the processing in the flow in FIG. 6 above ends.

Specifically, when attachment of the USB memory is sensed in step S1 in FIG. 6, since the data information output from the U3 memory is stored in a not-shown memory, processing for transferring the data information output from the U3 memory and stored in that memory is performed. Alternatively, as USB control unit 60 may perform processing for accessing the U3 memory attached to USB connector 20, overall control unit 50 may obtain again the data information output from the U3 memory and processing for transferring the data information output from the U3 memory and obtained again may also be performed. Here, overall control unit 50 outputs the data information output from the U3 memory to emulation mode control unit 80.

As input of the data information output from the U3 memory and output from overall control unit 50 is received, the data information is transmitted to server 1200 connected to the network through communication portion 65.

Then, on server 1200 side, the input of the data information in the USB memory is accepted (step S22). Specifically, the data information is input to emulation mode control unit 1280 through communication interface portion 1207.

Then, the data information is output to overall control unit 1215.

Then, receiving the input of the data information in the U3 memory from emulation mode control unit 1280, overall control unit 1215 performs processing for recognizing the USB memory (step S23).

In the present embodiment, overall control unit 1215 on server 1200 side functions as the general-purpose OS and it is adapted to the application in the USB memory complying with the U3 specifications.

Therefore, in the present embodiment, the U3 memory is recognizable by overall control unit 1215.

Specifically, receiving the input of the data information output from the U3 memory, overall control unit 1215 determines that the U3 memory was virtually attached to server 1200 in the emulation mode and it can recognize the U3 memory.

Then, when overall control unit 1215 successfully recognizes the U3 memory virtually attached to server 1200 in the emulation mode, overall control unit 1215 performs prescribed registration processing or the like so that a job involved with that USB memory can be executed.

Then, after overall control unit 1215 performs the processing for recognizing the U3 memory, overall control unit 1215 perform program start-up processing (step S24).

In the present embodiment, when the U3 memory is attached to USB connector 20 as described above, start-up data information of the authentication application which is an application complying with the U3 specifications is output.

Therefore, overall control unit 1215 performs program start-up processing based on the start-up data information.

Thereafter, processing for transferring information on a program start-up screen is performed (step S25).

Specifically, receiving a result of program start-up processing by overall control unit 1215, screen display control unit 1211 outputs the information on the program start-up screen for display on display 1205 to emulation mode control unit 1280.

Emulation mode control unit 1280 outputs the information on the program start-up screen from screen display control unit 1211 to MFP 1 connected to the network through communication interface portion 1207.

Thereafter, on MFP 1 side, input of the information on the program start-up screen transferred from server 1200 side is accepted (step S26). Specifically, emulation mode control unit 80 accepts the input of the information on the program start-up screen.

Thereafter, the program start-up screen is displayed on operation display 12 of operation panel portion 10 (step S27).

An example where the program start-up screen is displayed on operation display 12 will be described with reference to FIG. 10.

Figure 10:
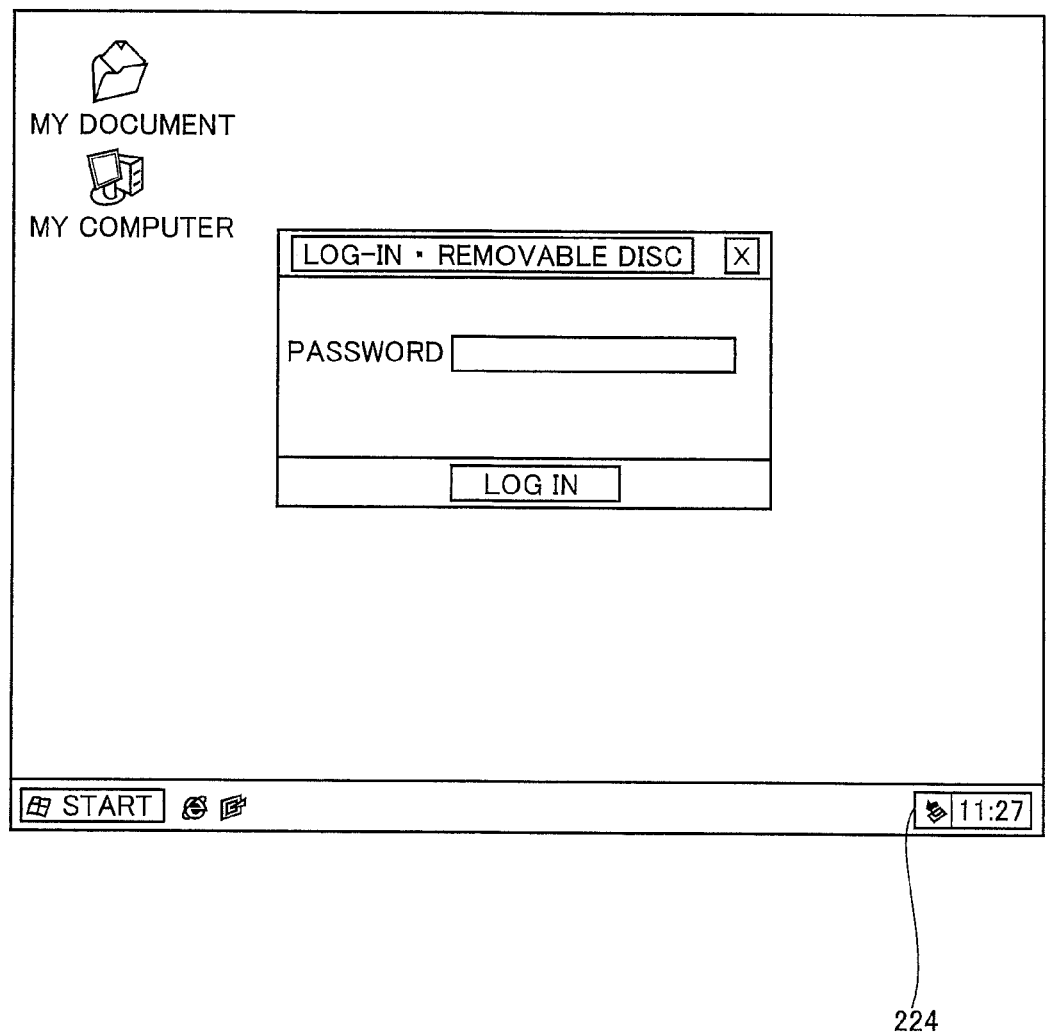
FIG. 10 is a diagram illustrating an example where a program start-up screen is displayed on the operation display.

Referring to FIG. 10, on the operation screen displayed on operation display 12 described in connection with FIG. 8, the program start-up screen is further displayed as the start-up data information of the encryption application stored in the U3 memory is started up.

In the present embodiment, a start-up screen for entering a password for log-in is shown as the program start-up screen.

In a lower right portion of operation display 12, a program start-up icon 224 is generated and displayed based on the start-up data information of the U3 memory.

As described above, server 1200 can remotely be operated through operation panel portion 10 of MFP 1 in accordance with emulation mode control unit 80 on MFP 1 side and emulation mode control unit 1280 on server 1200 side, and the state is such that virtual attachment of the U3 memory to server 1200 is recognized in the emulation mode. Processing on server 1200 side for causing operation panel portion 10 to emulate input device 1209 of server 1200 will mainly be described hereinafter.

Processing for password entry will now be described.

Processing for user's password entry will be described with reference to FIG. 11.

Figure 11:
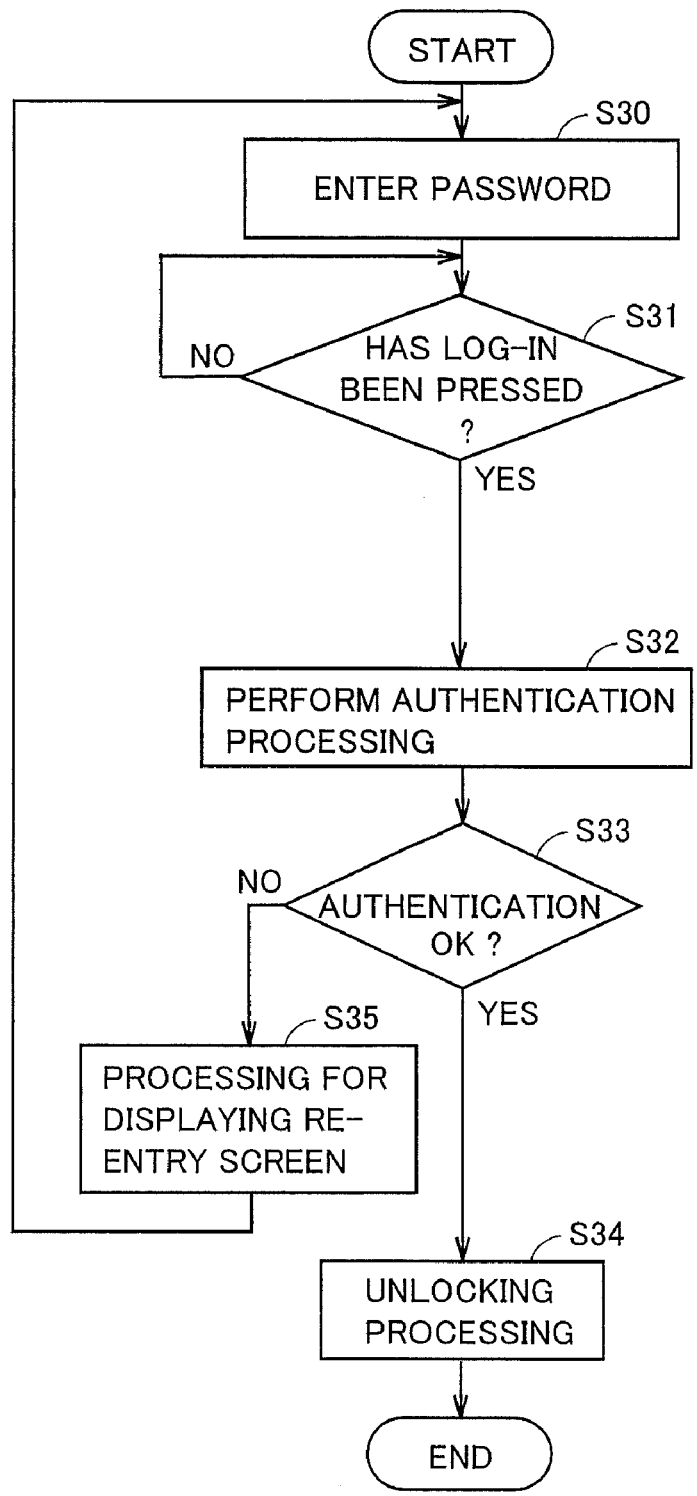
FIG. 11 is a flowchart illustrating processing for user's password entry.

Referring to FIG. 11, a password is entered (step S30). Specifically, a numeric password can be entered by using numeric key 202 of operation panel portion 10. In FIG. 10, a keyboard input screen may be displayed so that input through a keyboard serving as input device 1209 of server 1200 can also be made also on operation display 12 of MFP 1, although not shown. Then, a password may be entered by using the keyboard input screen.

Thereafter, overall control unit 1215 determines whether a log-in key in operation panel portion 10 has been entered or not (step S31). Specifically, password entry and log-in entry provided in operation panel portion 10 are sensed and overall control unit 1215 determines whether log-in entry has been provided or not. Then, when the log-in entry was provided, overall control unit 1215 performs authentication processing (step S32). Then, overall control unit 1215 determines whether authentication processing indicates OK or not based on password entry (step S33). When the authentication processing indicates OK, unlocking processing is performed (step S34). Then, the process ends (end).

On the other hand, when the authentication processing indicates NG in step S33, a re-entry screen is displayed (step S35). Here, the re-entry screen is displayed on operation display 12 of operation panel portion 10. Specifically, as described above, the program start-up screen described in connection with FIG. 10 is displayed again on operation display 12 and processing from step S30 described above is repeated as the user enters again a password.

In such processing, when authentication indicates OK in step S33, unlocking processing is performed in step S34 and access such as data write to the data area described in connection with FIG. 5 can be made.

Through such processing, for example, regarding the USB memory having the data area and the application area such as a U3 memory, the application stored in the application area is developed on server 1200 side and server 1200 is remotely operated, so that authentication processing can be performed. Namely, as a result of unlocking, access to the U3 memory is permitted.

An example where a Scan to USB memory job for storing image data scanned by using the scanning function of MFP 1 in the U3 memory is executed will now be described.

A flow of processing for executing a Scan to USB memory job according to the embodiment of the present invention in the emulation mode will be described with reference to FIG. 12.

Figure 12:
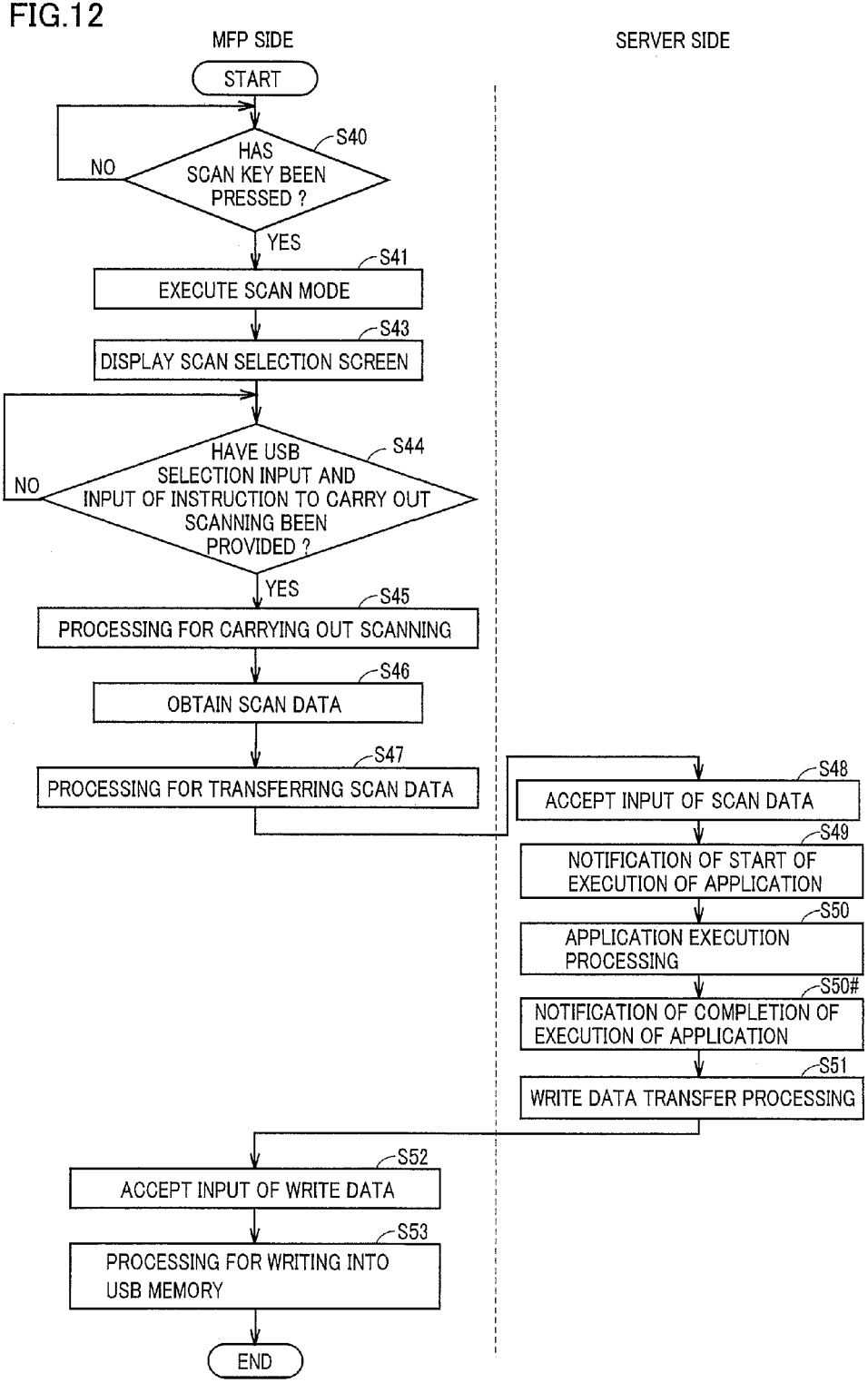
FIG. 12 is a flowchart illustrating processing for executing a Scan to USB memory job according to the embodiment of the present invention in the emulation mode.

Referring to FIG. 12, initially, whether scan key 211 has been pressed or not is determined (step S40). Specifically, when scan key 211 in operation panel portion 10 is pressed, a scan mode is executed (step S41). Specifically, panel control unit 70 senses pressing of scan key 211 and outputs a result of sensing to emulation mode control unit 80 through overall control unit 50. Then, receiving the result of sensing, emulation mode control unit 80 executes the scan mode in the emulation mode.

A scan selection screen, in which buttons for basic/advanced setting to be made in a scanning operation are arranged, is displayed on operation display 12 (step S43).

The scan selection screen on operation display 12 will be described with reference to FIG. 13.

Figure 13:
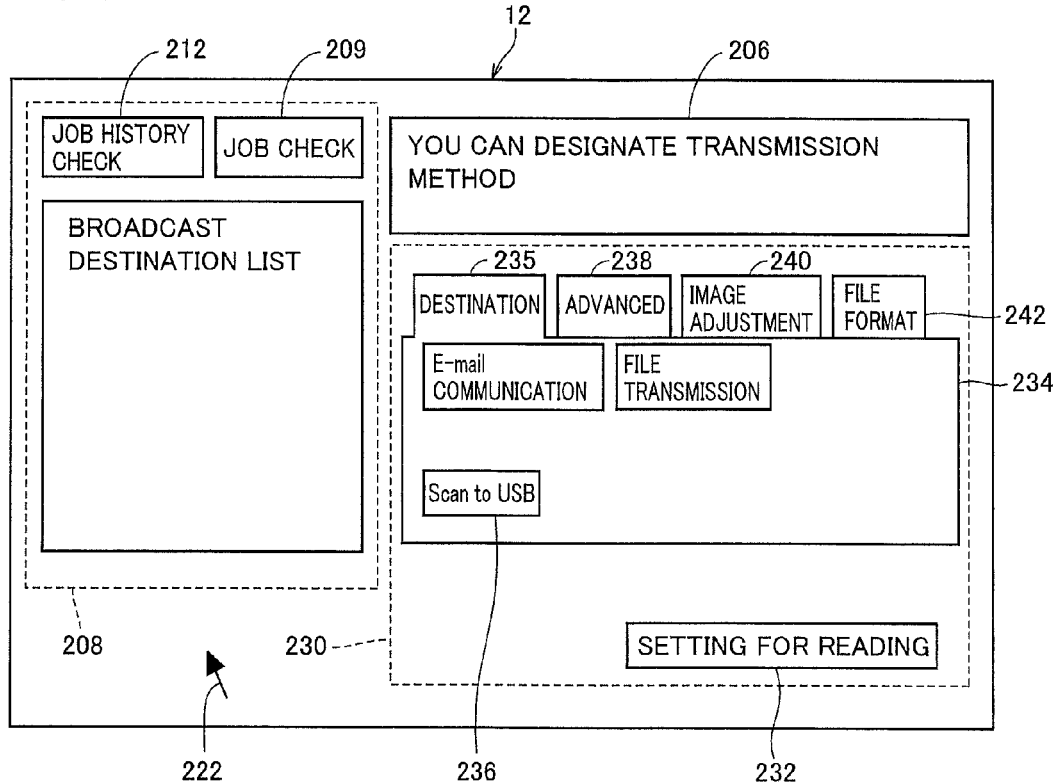
FIG. 13 is an exemplary diagram illustrating a scan selection screen on the operation display.

Referring to FIG. 13, operation display 12 is provided with touch panel 206 for display of various modes or for making setting or the like as described above. Here, buttons for basic/advanced settings to be made in the scanning operation are arranged.

When each button is pressed, a screen layer for detailed setting is displayed. For example, here, a command button in an example where a "destination" button has been pressed is shown. Specifically, the user can selectively determine a transmission method for transmitting image data obtained through the scanning operation. Specifically, a state where selection from three transmission methods of an "E-mail communication" mode where scanned image data is transmitted via E-mail, a "file transmission" mode where scanned image data is transmitted through an FTP (File Transfer Protocol) server, and a "Scan to USB" mode where scanned image data is stored in the USB memory can be made is shown. When "E-mail communication" or "file transmission" is selected, a destination address or the like should be input.

In addition, an "advanced" button 238, an "image adjustment" button 240, and a "file format" button 242 are provided, and various settings in the scanning operation can be made. Though the description will be provided later, specifically, when "advanced" button 238 is pressed, a screen allowing selection of an expanded function is displayed based on the input of the application information described above. Alternatively, when "image adjustment" button 240 is pressed, execution of an application for image edition such as a "noise removal" function incorporated in MFP 1 on the image data obtained in the scanning operation can be selected. Alternatively, when "file format" button 242 is pressed, a format of a transmission file (JPEG (Joint Photographic Experts Group), TIFF (Tagged Image File Format), PDF (Portable Document Format), and the like) can be selected.

In the present embodiment, an example where a "Scan to USB" button 236 is selected in the emulation mode in a screen 234 in which "destination" has been selected will be described.

A USB memory selection screen shown when "Scan to USB" button 236 is selected will be described with reference to FIG. 14.

Figure 14:
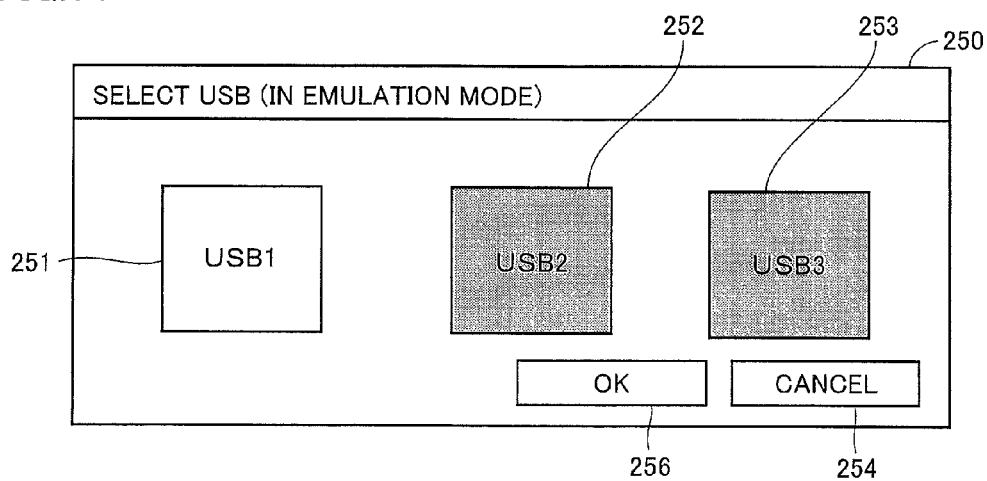
FIG. 14 is a diagram illustrating a USB memory selection screen shown when a "Scan to USB" button is selected.

Referring to FIG. 14, here, a screen 250 for selecting a USB memory is displayed as a screen layer when "Scan to USB" button 236 is pressed. When "Scan to USB" button 236 is pressed and while the emulation mode is set, an indication that the emulation mode is set is given and a USB memory in the emulation mode is displayed so that selection thereof can be made. In the present embodiment, an example where an icon button 251 of "USB1" is in the emulation mode and displayed as selectable is shown. As an icon button 252 of "USB2" and an icon button 253 of "USB3" connected to other USB connectors cannot be used, they are inactive.

When the user presses and selects icon button 251 of USB1 and presses an "OK" button 256, the U3 memory in the present embodiment which is the destination of image data in the "Scan to USB" mode can be selected. Such setting that inactive icon button 252 of "USB2" or icon button 253 of "USB3" is selected to transmit image data to the selected USB memory may also be made.

Referring again to FIG. 12, whether input of USB memory selection and input of an instruction to carry out scanning have been provided or not is determined (step S44). Specifically, in the screen for selecting the USB memory described in connection with FIG. 14, whether icon button 251 of the USB in the emulation mode is pressed to select the U3 memory or not and whether start key 201 has been pressed or not are determined.

When the input of the instruction to carry out scanning has been provided in step S44, that is, when start key 201 is pressed, processing for carrying out scanning is performed (step S45). Specifically, as described in connection with FIG.

1, a document is fed from feeder portion 17 to scanner 13, and scan data which is image data is obtained by optically reading the fed document (step S46).

Here, when the input of the instruction to carry out scanning has been provided, that is, even when the job is being continued after the Scan to USB memory job was started, the job can be executed, because processing such as a copy or print job is separate as a job function. For example, by pressing copy key 210 described in connection with FIG. 3, the user can execute the copy job.

Then, scanner control unit 35 outputs the scan data to emulation mode control unit 80 through overall control unit 50.

Then, emulation mode control unit 80 outputs the scan data (step S47).

Thereafter, on the server side, emulation mode control unit 1280 accepts input of the scan data (step S48).

Then, emulation mode control unit 1280 outputs the scan data to overall control unit 1215.

Then, overall control unit 1215 outputs a notification of start of execution of the application to MFP 1 before the application is executed on the scan data (step S49). The notification of start of execution of the application is received by emulation mode control unit 80 of MFP 1 and output to a job management unit 55. Job management unit 55 can thus recognize start of execution of the application in server 1200.

Thereafter, overall control unit 1215 executes the application on the scan data (step S50). For example, when the information on selection of the encryption application in the application area of the U3 memory described in connection with FIG. 5 is included, overall control unit 1215 starts up the encryption application in the U3 memory and subjects the obtained scan data to encryption processing. Similarly, when the information on selection of the compression application is included, the obtained scan data is subjected to compression processing.

Thereafter, the overall control unit outputs a notification of completion of execution of the application to MFP 1 (step S50#). The notification of completion of execution of the application is received by emulation mode control unit 80 of MFP1 and output to job management unit 55. Job management unit 55 can thus recognize completion of execution of the application in server 1200.

Thereafter, overall control unit 1215 outputs as write data, the scan data on which the application was executed to emulation mode control unit 1280, in order to write the data in the U3 memory which is the data write target and represents the USB memory that has made transition to the emulation mode. Emulation mode control unit 1280 performs processing for transferring the write data to emulation mode control unit 80 (step S51).

Thereafter, emulation mode control unit 80 accepts input of write data from emulation mode control unit 1280 (step S52).

Then, receiving the input of the write data, emulation mode control unit 80 outputs the write data to overall control unit 50.

Specifically, overall control unit 50 receives the write data subjected to emulation processing and output from emulation mode control unit 80, and outputs the write data to USB control unit 60.

Then, USB control unit 60 performs processing for writing the write data in the USB memory complying with the U3 specifications (step S53). The process thus ends (end).

According to this technique, even when the USB memory complying with the U3 specifications that stores the application not adapted to the OS incorporated in the MFP is attached to the MFP, the scan data can be stored in that USB memory.

In addition, data on which the application was executed can be stored in the data area of the USB memory by using the application stored in the application area of the USB memory complying with the U3 specifications.

According to the technique in the embodiment of the present invention, for example, when the MFP side cannot recognize the USB memory complying with the U3 specifications, specifically, when an application stored in the USB memory complying with the U3 specifications is not adapted to the embedded OS of the MFP, transition to the emulation mode is made, data is transferred to the server side to have the server recognize the USB memory complying with the U3 specifications, and the MFP side remotely operates the server. Processing for accessing the USB memory complying with the U3 specifications can thus be performed. Specifically, the scan data read in the scan mode can be transferred to the server, the scan data is transferred from the server as write data, and USB control unit 60 can perform processing for writing the data in the USB memory complying with the U3 specifications.

Job execution management according to the embodiment of the present invention will now be described. Specifically, processing in job management unit 55 will be described.

A job execution management technique according to the embodiment of the present invention will be described with reference to FIG. 15.

Figure 15:
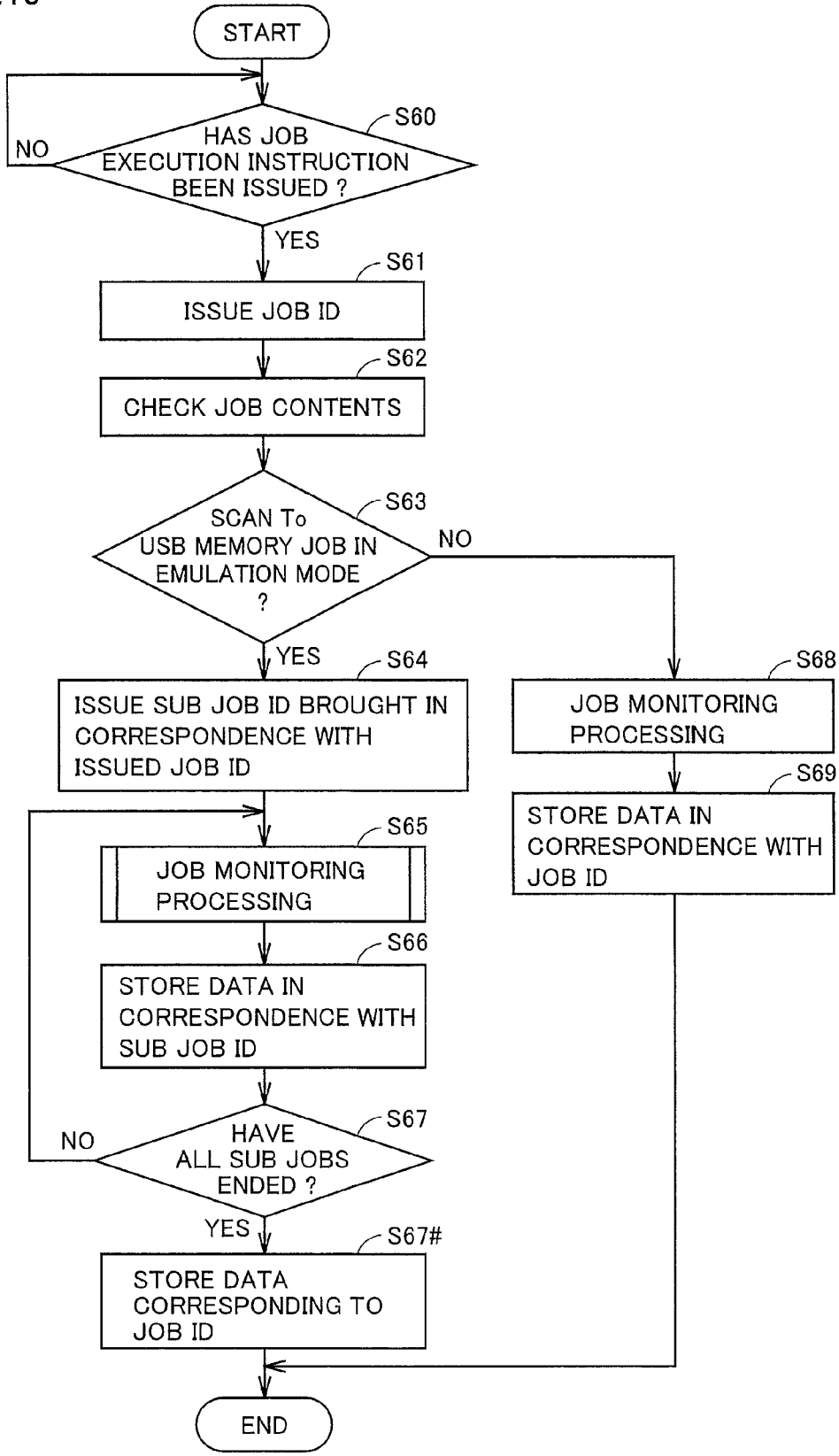
FIG. 15 is a flowchart illustrating a job execution management technique according to the embodiment of the present invention.

Referring to FIG. 15, job management unit 55 determines whether a job execution instruction has been issued or not (step S60). Specifically, with reference to the examples above for explanation, it is determined that a job execution instruction has been issued when a U3 memory is selected by pressing icon button 251 of the USB in the emulation mode in the screen for selecting a USB memory described in connection with FIG. 14 and start key 201 is pressed.

When it is determined in step S60 that the job execution instruction has been issued, a job ID (Identification) is issued (step S61).

Then, job management unit 55 checks job contents in accordance with the job execution instruction (step S62).

Then, whether the job is the Scan to USB memory job in the emulation mode or not is determined (step S63). Namely, whether the job is a job requiring processing in coordination with the external server or not is determined.

When it is determined in step S63 that the job is the Scan to USB memory job in the emulation mode, a sub job ID brought in correspondence with the issued job ID is issued (step S64). Specifically, job management unit 55 issues a sub job ID brought in correspondence with the job ID based on the job contents in accordance with the job execution instruction. In the case of the Scan to USB memory job in the present embodiment, five sub job IDs are issued. Specifically, in the case of the Scan to USB memory job, five sub jobs, that is, processing for obtaining the image data by reading the document image with scanner 13 (Scan→MFP), processing for transmitting the obtained image data to server 1200 by means of emulation mode control unit 80 (MFP→external device), processing for executing the application in server 1200 on the transmitted image data (processing within the external device), processing for receiving the data transmitted from server 1200 by means of emulation mode control unit 80 (external device→MFP), and processing for writing the received data in the USB memory by means of USB control unit 60 (MFP→USB (U3) memory) are performed. In the present embodiment, each processing constituting the job is also referred to as a sub job.

Therefore, job management unit 55 issues a sub job ID brought in correspondence with the job ID for each processing, based on the job contents.

A job management table of job management unit 55 will be described with reference to FIG. 16.

Figures 16, 17:
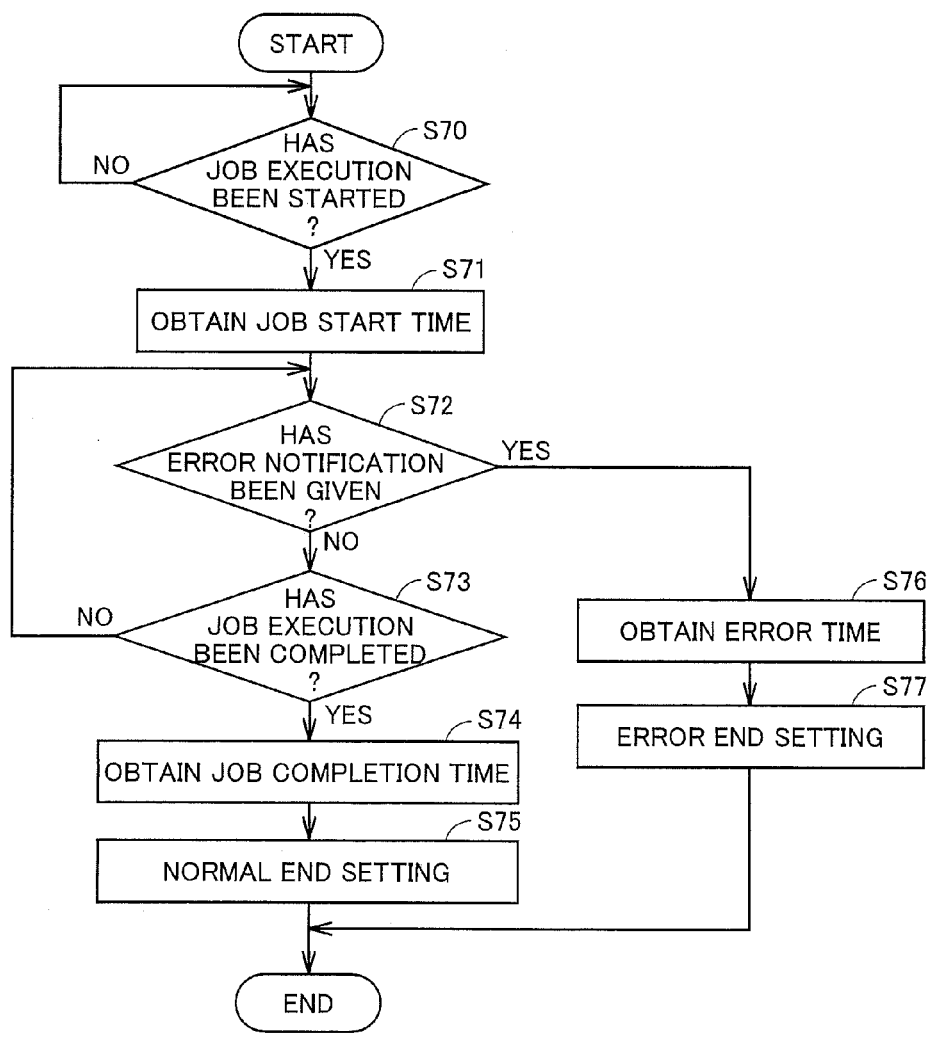
FIG. 16 is a diagram illustrating a job management table of a job management unit.
FIG. 17 is a flowchart illustrating job monitoring processing according to the embodiment of the present invention.

Referring to FIG. 16, in the job management table of job management unit 55, a job ID ("000011") is issued in accordance with the job execution instruction and a sub job ID ("S0" to "S4") for each processing (sub job) brought in correspondence with the issued job ID is issued.

Referring again to FIG. 15, thereafter, job management unit 55 performs job monitoring processing (step S65).

Job monitoring processing according to the embodiment of the present invention will be described with reference to FIG. 17.

Referring to FIG. 17, initially, job management unit 55 determines whether job (sub job) execution has been started or not (step S70).

Thereafter, job management unit 55 obtains a job start time (step S71).

Thereafter, whether error notification has been issued or not is determined (step S72).

When it is determined that there is no error notification issued in step S72, whether job (sub job) execution has been completed or not is determined (step S73).

When it is determined in step S73 that job (sub job) execution has not been completed, the process returns to step S72 and the processing described above is repeated.

On the other hand, when job execution is completed in step S73, a job completion time is obtained (step 74).

Then, normal end is set (step S75). The process then ends (end).

On the other hand, when it is determined in step S72 that there is an error notification issued, an error time is then obtained (step S76). Then, error end is set (step S77). The process then ends (end).

Referring again to FIG. 15, data is stored in correspondence with the sub job ID (step S66). Specifically, the job start time, the job completion time and a status indicating a job state are stored in fields corresponding to the sub job ID in the job management table described in connection with FIG. 16 above.

Then, whether all sub jobs ended or not is determined (step S67).

When all sub jobs ended in step S67, the data corresponding to the job ID is then stored (step S67#). In the present embodiment, when all sub jobs ended, the time of start of the Scan to USB memory job corresponding to the job ID, the time of completion thereof, and the status indicating the job state are stored. Then, the process ends (end).

On the other hand, when all sub jobs have not yet ended in step S67, the process returns to step S65 and the processing described above is repeated until all sub jobs end.

When it is determined in step S63 that the job is not the Scan to USB memory job in the emulation mode, for example, the job monitoring processing is thereafter performed on a normal copy job, a print job, or the like (step S68). As the job monitoring processing is the same as described in connection with FIG. 17, detailed description thereof will not be repeated. Then, the data is stored in correspondence with the job ID (step S69) and the process ends (end).

For example, a case that, when the Scan to USB memory job in the emulation mode according to the embodiment of the present invention is executed, the job start time, the job completion time and the status indicating the job state for each of the sub job for obtaining the image data by reading the document image with scanner 13 (Scan→MFP), the sub job for transmitting the obtained image data to server 1200 by means of emulation mode control unit 80 (MFP→external device), the sub job for executing the application in server 1200 on the transmitted image data (processing within the external device), the sub job for receiving the data transmitted from server 1200 by means of emulation mode control unit 80 (external device→MFP), and the sub job for writing the received data in the USB memory by means of USB control unit 60 (MFP→USB (U3) memory) are stored is shown in FIG. 16.

When all sub jobs ended, the time of start of the Scan to USB memory job corresponding to the job ID, the time of completion thereof, and the status indicating the job state are stored.

Here, the time of start of the Scan to USB memory job corresponds to the job start time of the sub job for obtaining the image data by reading the document image with scanner 13 (Scan→MFP), and the time of completion of the Scan to USB memory job and the status correspond to the job completion time and the status of the sub job for writing the received data in the USB memory by means of USB control unit 60 (MFP→USB (U3) memory).

As a result of this processing, the job management table of the Scan to USB memory job is completed. Though not illustrated here, job management unit 55 holds also an amount of image data processed in accordance with the job execution instruction, a day of creation, and the like as information.

Display of history of the jobs according to the embodiment of the present invention will now be described.

Display of the history of the jobs according to the embodiment of the present invention will be described with reference to FIG. 18.

Figure 18:
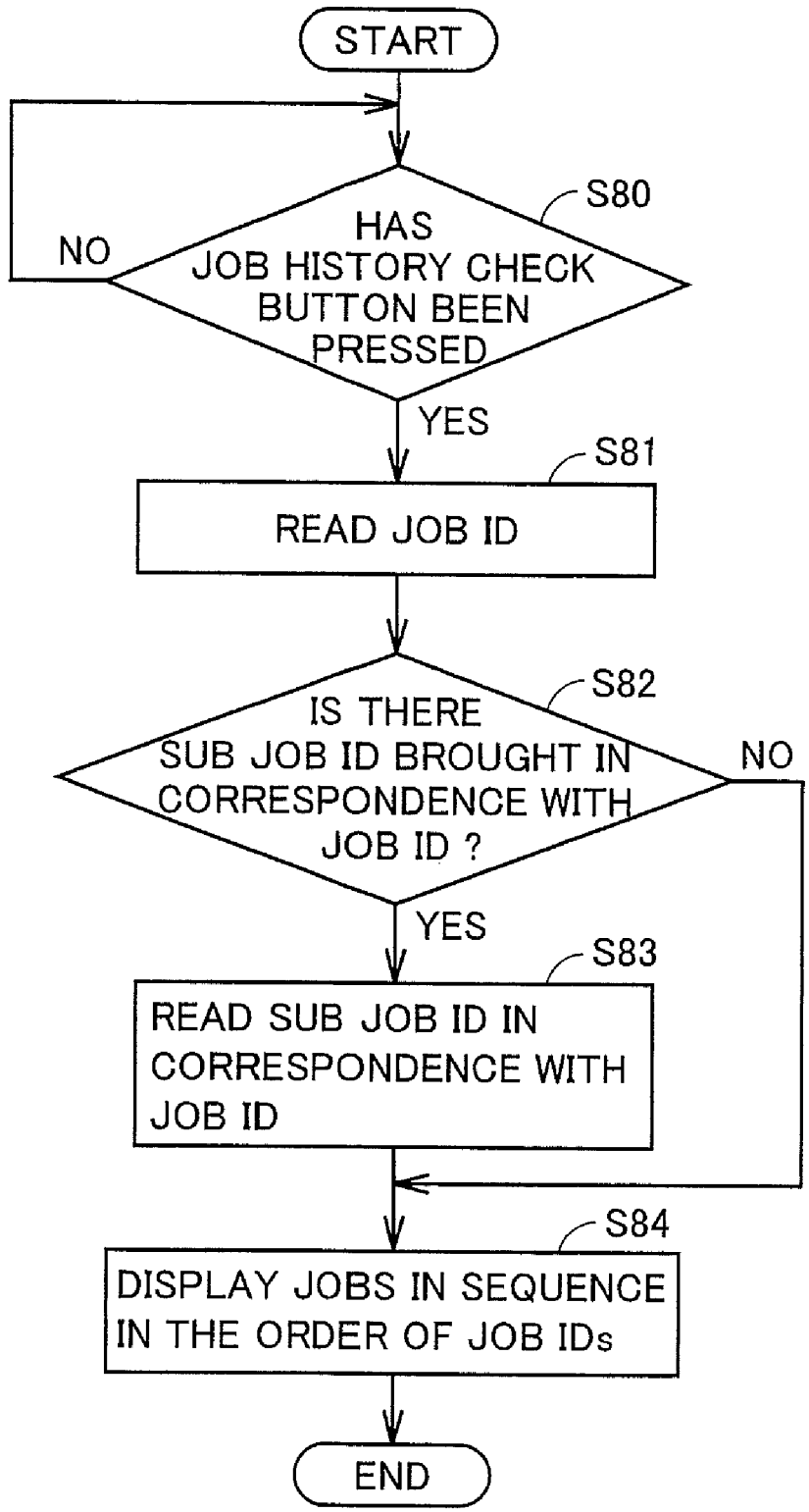
FIG. 18 is a flowchart illustrating display of history of the jobs according to the embodiment of the present invention.

Referring to FIG. 18, initially, whether the job history check button has been pressed or not is determined (step S80). Specifically, overall control unit 50 determines whether job history check button 212 in job information screen area 208 of touch panel 206 described in connection with FIG. 3 has been pressed or not.

When the job history check button has been pressed in step S80, overall control unit 50 reads the job ID (step S81). Specifically, overall control unit 50 reads data of the job ID stored in the job management table of job management unit 55.

Thereafter, whether there is a sub job ID or not is determined (step S82). Specifically, overall control unit 50 determines whether there is data of a sub job ID stored in the job management table of job management unit 55 or not.

When it is determined in step S82 that there is a sub job ID, the sub job ID is read in correspondence with the job ID (step S83). Specifically, when it is determined that there is data of the sub job ID stored in the job management table of job management unit 55, overall control unit 50 reads the data of the sub job ID.

Thereafter, the jobs are displayed in sequence in the order of job IDs (step S84). Specifically, overall control unit 50 provides output to panel control unit 70 such that the jobs are displayed in sequence in the order of job IDs, based on the read job ID and sub job ID data.

Panel control unit 70 causes operation panel portion 10 to display a job history check screen which will be described later, in accordance with an instruction from overall control unit 50.

A job history check screen according to the embodiment of the present invention will be described with reference to FIG. 19.

Referring to FIG. 19, here, the job IDs issued in accordance with the job execution instruction are displayed in sequence in the ascending order and the contents thereof are shown.

Specifically, Scan to USB (U3) memory having a job ID "000011", copy (5 pages, 3 copies) having a job ID "000012" and copy (1 page, 3 copies) having a job ID "000013" are displayed in sequence. In addition, as the job ID ("000011") is brought in correspondence with the sub job IDs, the sub job IDs are also read in correspondence with the job ID, and the sub job for obtaining the image data by reading the document image with scanner 13 (Scan→MFP), the sub job for transmitting the obtained image data to server 1200 by means of emulation mode control unit 80 (MFP→external device), the sub job for executing the application in server 1200 on the transmitted image data (processing within the external device), the sub job for receiving the data transmitted from server 1200 by means of emulation mode control unit 80 (external device→MFP), and the sub job for writing the received data in the USB memory by means of USB control unit 60 (MFP→USB (U3) memory) are displayed in sequence in the ascending order.

The job start time, the job completion time and the status thereof are shown.

A job history check screen according to a comparative example will be described with reference to FIG. 20.

Referring to FIG. 20, when the Scan to USB memory job using the external server was executed, processing was performed as history of execution of a plurality of jobs. Specifically, the processing was divided into a job for obtaining the image data by reading the document image with scanner 13 (Scan→MFP), a job for transmitting the obtained image data to server 1200 by means of emulation mode control unit 80 (MFP→external device), a job for receiving the data transmitted from server 1200 by means of emulation mode control unit 80 (external device→MFP), and a job for writing the received data in the USB memory by means of USB control unit 60 (MFP→USB (U3) memory). Namely, conventionally, even though the user intends execution of a single job as a command, processing contents were not brought in correspondence with each other as one job and hence the job was managed as each individual job. In addition, a job ID was issued at the time of execution of each job for management.

Therefore, even though a single job is executed, the job was managed as a plurality of jobs as shown in FIG. 20 and history of a series of executed jobs could not be grasped at a glance.

In other words, conventionally, as detailed progress of a process of the Scan to USB memory job could not be managed as a whole, the user had to check, step by step, the progress of each processing.

In particular, as the job ID is issued in chronological order each time the job is executed, for example, when a copy job is executed (job ID ("000013")) while processing in the external device located outside the MFP is being performed as shown here, history of execution of the copy job which is a different job is displayed in the history of a series of executed jobs in the Scan to USB memory job.

Thus, it has been difficult to check the job execution history in spite of a single job execution instruction being provided.

In contrast, according to the job history check screen in the embodiment of the present invention, when the user indicates execution of a single job as a command, one job ID is issued and managed. When a plurality of processing contents are performed in one job, sub job IDs corresponding to the plurality of processing contents respectively brought in correspondence with the issued job ID are issued and managed and the job is displayed for each job ID constituted of a plurality of sub job IDs in such a manner that the processing contents of respective sub jobs are displayed in a group. The history of a series of executed jobs can thus be grasped at a glance.

Therefore, the job execution history can readily be checked.

In addition, conventionally, when the external device located outside performs processing, the processing is handled as outside the matters to be managed by the MFP and the progress of the processing in the external device could not be grasped. According to the technique in the embodiment of the present invention, however, as processing based on an application in the external device is also managed by job management unit 55 in the MFP, detailed progress of the process of the Scan to USB memory job can be managed.

In the description above, a USB memory complying with the U3 specifications has been discussed, however, the memory is not limited to the USB memory complying with the U3 specifications. For example, another USB memory, for example, not recognized by the embedded OS but recognized only by the general-purpose OS is also similarly applicable.

In the present embodiment, an MFP including a plurality of connectors as USB connectors has been described, however, the MFP is not particularly limited as such. In particular, the number of connectors is not limited.

An image processing apparatus according to the present invention is not limited to an MFP, and any image processing apparatus such as a printer or a facsimile machine may be adopted. Regarding a controller for controlling the image processing apparatus, a program causing a computer to function and carry out control as described in the flow above may be provided. Such a program may be recorded in a computer-readable recording medium such as a flexible disc, a CD-ROM (Compact Disk-Read Only Memory), a ROM (Read Only Memory), a RAM (Random Access Memory), and a memory card, to be attached to a computer, and may be provided as a program product. Alternatively, a program may be provided as recorded in a recording medium such as a hard disk contained in a computer. Alternatively, a program may be provided by downloading through a network.

A program according to the present invention may invoke a necessary module from among program modules provided as a part of the operation system (OS) of the computer at prescribed timing in prescribed sequences and cause the module to perform processing. Here, the program itself does not include the module above but processing is performed in cooperation with the OS. Such a program not including a module may also be encompassed in the program according to the present invention.

In addition, the program according to the present invention may be provided as incorporated as a part of another program. In this case as well, the program itself does not include the module included in another program but processing is performed in cooperation with another program. Such a program incorporated in another program may also be encompassed in the program according to the present invention.

A provided program product is installed in a program storage portion such as a hard disk and executed. It is noted that the program product includes a program itself and a recording medium recording a program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus connected to an external terminal device through a network, the image processing apparatus comprising:
a connector to which a removable external storage device, having an application program recorded thereon, is attachable;
a scanner for obtaining image data by scanning a document image;
a memory for storing job processing information;
an input device for accepting a user's operation input; and
a controller configured to control said image processing apparatus for
entering into an emulation mode causing said input device to emulate an operation function of said external terminal device, wherein the operation function is not natively supported by the input device;
transmitting said image data to said external terminal device when said removable external storage device is attached to said connector,
receiving said image data from said external terminal device after it has been processed by said external terminal device,
writing said image data received from said external terminal device into said removable external storage device,
issuing an identification number in accordance with an order of execution of job processing and causing said memory to store the identification number,
monitoring a processing state of the processing corresponding to the issued identification number of said job processing and causing said memory to store the processing state,
issuing, when the contents of said job processing includes execution of a plurality of sub jobs, which are steps for processing said job, wherein at least one step is an additional step to perform said job when emulation mode is used for said job, a sub identification number associated with the identification number issued in correspondence with accepted said job, in accordance with the order of said processing and causing said memory to store the sub identification number, and
monitoring a processing state of the sub job corresponding to each said sub identification number and causing said memory to store the processing state.

2. The image processing apparatus according to claim 1, wherein
the contents of said job processing include
a sub job for obtaining the image data by scanning said document image with said scanner,
a sub job for transmitting the obtained image data to said external terminal device,
a sub job for subjecting the image data transmitted to said external terminal device to processing based on a prescribed application,
a sub job for receiving the image data transmitted from said external terminal device, that has been subjected to the processing based on the prescribed application, and
a sub job for writing received data into the external storage device inaccessible by said image processing apparatus.

3. The image processing apparatus according to claim 1, further comprising a display, wherein
said controller causes said display to display a group of the processing states corresponding to respective said sub identification numbers associated with said issued identification numbers stored in said management table.

4. A method of controlling an image processing apparatus connected to an external terminal device through a network, said image processing apparatus including a connector to which a removable external storage device is attachable, a scanner for obtaining image data by scanning a document image, an input device for accepting a user's operation input, a memory for storing job processing information, and a controller configured to control said image processing apparatus, comprising the steps of:
accepting a user's operation input,
entering into an emulation mode causing said input device to emulate an operation function of said external terminal device, wherein the operation function is not natively supported by the input device;
transmitting said image data to said external terminal device when said removable external storage device is attached to said connector,
receiving said image data from said external terminal device after it has been processed by said external terminal device,
writing said image data received from said external terminal device into said removable external storage device,
issuing an identification number in accordance with an order of execution of job processing;
causing said memory to store issued said identification number;
monitoring a processing state of the processing corresponding to the issued identification number of said job processing; and
causing said memory to store monitored said processing state,
said step of issuing an identification number including the step of issuing, when the contents of said job processing include execution of a plurality of sub jobs, which are steps for processing said job, wherein at least one step is an additional step to perform said job when emulation mode is used for said job, a sub identification number associated with the identification number issued in correspondence with accepted said job, in accordance with the order of said processing,
said step of causing said memory to store issued said identification number including the step of causing said memory to store issued said sub identification number,
said step of monitoring a processing state including the step of monitoring the sub job corresponding to each said sub identification number, and
said step of causing said memory to store monitored said processing state including the step of causing said memory to store the processing state of the processing corresponding to each said sub identification number.

5. The method of controlling an image processing apparatus according to claim 4, wherein
the contents of said job processing include
a sub job for obtaining the image data by scanning said document image with said scanner,
a sub job for transmitting the obtained image data to said external terminal device,
a sub job for subjecting the image data transmitted to said external terminal device to processing based on a prescribed application,
a sub job for receiving the image data transmitted from said external terminal device, that has been subjected to the processing based on the prescribed application, and
a sub job for writing received data into the external storage device inaccessible by said image processing apparatus.

6. The method of controlling an image processing apparatus according to claim 4, wherein
said image processing apparatus further includes a display, and
said method further comprises the step of displaying in a list, on said display, a processing state corresponding to each said sub identification number associated with said issued identification number stored in said management table.

7. A non-transitory recording medium for recording a control program to be executed by a computer included in an image processing apparatus connected to an external terminal device through a network, said image processing apparatus including a connector to which a removable external storage device is attachable, a scanner for obtaining image data by scanning a document image, an input device for accepting a user's operation input, a memory for storing job processing information, and a controller configured to control said image processing apparatus, said control program causing said computer to perform processing including the steps of:
accepting a user's operation input,
entering into an emulation mode causing said input device to emulate an operation function of said external terminal device, wherein the operation function is not natively supported by the input device;
transmitting said image data to said external terminal device when said removable external storage device is attached to said connector,
receiving said image data from said external terminal device after it has been processed by said external terminal device,
writing said image data received by said external terminal device into said removable external storage device,
issuing an identification number in accordance with an order of execution of job processing;
causing said memory to store issued said identification number;
monitoring a processing state of the processing corresponding to the issued identification number of said job processing; and
causing said memory to store monitored said processing state,
said step of issuing an identification number including the step of issuing, when the contents of said job processing include execution of a plurality of sub jobs, which are steps for processing said job, wherein at least one step is an additional step to perform said job when emulation mode is used for said job, a sub identification number associated with the identification number issued in correspondence with accepted said job, in accordance with the order of said processing,
said step of causing said memory to store issued said identification number including the step of causing said memory to store issued said sub identification number,
said step of monitoring a processing state including the step of monitoring the sub job corresponding to each said sub identification number, and
said step of causing said memory to store monitored said processing state including the step of causing said memory to store the processing state of the processing corresponding to each said sub identification number.

8. The non-transitory recording medium according to claim 7, wherein
the contents of said job processing include
a sub job for obtaining the image data by scanning said document image with said scanner,
a sub job for transmitting the obtained image data to said external terminal device,
a sub job for subjecting the image data transmitted to said external terminal device to processing based on a prescribed application,
a sub job for receiving the image data transmitted from said external terminal device, that has been subjected to the processing based on the prescribed application, and
a sub job for writing received data into the external storage device inaccessible by said image processing apparatus.

9. The non-transitory recording medium according to claim 7, wherein
said image processing apparatus further includes a display, and
said control program causes said computer to perform processing further including the step of displaying in a list, on said display, a processing state corresponding to each said sub identification number associated with said issued identification number stored in said management table.

10. The image processing apparatus according to claim 1, further comprising:
wherein said memory stores a management table for managing the history of job processing, and
said controller is configured for:
determining whether data stored in said external storage device is accessible by said image processing apparatus, based on information output from the external storage device attached to said connector,
causing said input device to emulate an operation function of said external terminal device for remotely operating said external storage device, when the data stored in said external storage device is inaccessible by said image processing apparatus,
determining whether said input device has accepted an instruction input indicating execution of the job processing including at least one sub job, and
indicating execution of the sub job based on contents of said job processing when it is determined that said input device has accepted the instruction input indicating execution of said job processing.

11. The image processing apparatus according to claim 10, wherein the data transmitted to said external terminal device is image data obtained by the scanner scanning a document image.

12. The method of controlling an image processing apparatus according to claim 4, further comprising:
storing a management table for managing the history of job processing in said memory,
determining whether data stored in said external storage device is accessible by said image processing apparatus, based on information output from the external storage device attached to said connector,
causing said input device to emulate an operation function of said external terminal device for remotely operating said external storage device, when the data stored in said external storage device is inaccessible by said image processing apparatus,
determining whether said input device has accepted an instruction input indicating execution of the job processing including at least one sub job,
indicating execution of the sub job based on contents of said job processing when it is determined that said input device has accepted the instruction input indicating execution of said job processing.

13. The non-transitory recording medium according to claim 7, wherein said control program further comprises the steps of:

storing a management table for managing the history of job processing in said memory, determining whether data stored in said external storage device is accessible by said image processing apparatus, based on information output from the external storage device attached to said connector, causing said input device to emulate an operation function of said external terminal device for remotely operating said external storage device, when the data stored in said external storage device is inaccessible by said image processing apparatus, determining whether said input device has accepted an instruction input indicating execution of the job processing including at least one sub job, indicating execution of the sub job based on contents of said job processing when it is determined that said input device has accepted the instruction input indicating execution of said job processing.

* * * * *